United States Patent
Aiyama et al.

(10) Patent No.: US 7,274,483 B2
(45) Date of Patent: Sep. 25, 2007

(54) PROCESSING OF PRINT DATA RECEIVED OVER A NETWORK, AND IMAGE FORMATION USING THE PROCESSED DATA

(75) Inventors: Kenji Aiyama, Yokohama (JP); Toru Maeda, Mitaka (JP); Kenzo Sekiguchi, Machida (JP); Ritsushi Tanabe, Yokohama (JP); Kotaro Yamaguchi, Kawasaki (JP); Hiroyuki Yaguchi, Inagi (JP); Tomohiro Akiba, Nagaizumicho (JP)

(73) Assignee: Canon Kabushiki Kaisha, Tokyo (JP)

( * ) Notice: Subject to any disclaimer, the term of this patent is extended or adjusted under 35 U.S.C. 154(b) by 62 days.

(21) Appl. No.: 11/180,557

(22) Filed: Jul. 14, 2005

(65) Prior Publication Data

US 2005/0254087 A1   Nov. 17, 2005

Related U.S. Application Data

(63) Continuation of application No. 09/487,720, filed on Jan. 19, 2000, now abandoned.

(30) Foreign Application Priority Data

Jan. 19, 1999  (JP) .................... 11-011169
Jan. 22, 1999  (JP) .................... 11-014871

(51) Int. Cl.
*G06F 15/00* (2006.01)
*G06K 1/00* (2006.01)

(52) U.S. Cl. ..................... 358/1.15; 358/1.9

(58) Field of Classification Search ............. 358/1.1, 358/1.9, 1.11–1.18, 453; 715/527
See application file for complete search history.

(56) References Cited

U.S. PATENT DOCUMENTS

| 5,731,823 | A | 3/1998 | Miller et al. | ............ 347/5 |
| 5,909,602 | A | 6/1999 | Nakai et al. | ............ 399/8 |
| 6,204,867 | B1 | 3/2001 | Fujimoto et al. | ............ 347/118 |
| 6,351,317 | B1 * | 2/2002 | Sasaki et al. | ............ 358/1.15 |
| 6,362,894 | B1 | 3/2002 | Shima | ............ 358/1.15 |
| 6,628,413 | B1 * | 9/2003 | Lee | ............ 358/1.15 |

FOREIGN PATENT DOCUMENTS

| JP | 10-016354 | 1/1998 |
| JP | 10-222434 | 8/1998 |

* cited by examiner

*Primary Examiner*—Gabriel I. Garcia
*Assistant Examiner*—Thierry L. Pham
(74) *Attorney, Agent, or Firm*—Fitzpatrick, Cella, Harper & Scinto

(57) ABSTRACT

In an image forming apparatus which is connected to a network (30), and forms an image on the basis of data acquired from the network, upon receiving a URL that designates image data to be acquired from a console, the URL is interpreted, and a data request is submitted to a server via the network on the basis of the interpretation result. Image data sent from the server in response to that data request is stored. If the image data is a JPEG image, an image process that warrants excellent tone reproduction is made; if the image data is a GIF image, an image process that warrants high resolution is made, and the processed image data is output to a printer to print it out.

12 Claims, 16 Drawing Sheets

PROCESSING OF PRINT DATA RECEIVED OVER A NETWORK, AND IMAGE FORMATION USING THE PROCESSED DATA

This application is a continuation of application Ser. No. 09/487,720 filed Jan. 19, 2000 now abandoned.

BACKGROUND OF THE INVENTION

1. Field of the Invention

The present invention relates to an image forming apparatus which is connected to a network, and is capable of forming an image by accessing the network to acquire image data, and an image processing method in the apparatus.

2. Description of the Related Art

In recent years, a WWW (World Wide Web) server having various information contents, and a computer with dedicated software (to be referred to as a browser hereinafter) for accessing the server by HTTP (Hyper Text Transfer Protocol) are connected via a network, and one can view desired information on that WWW server from the computer. The browser can acquire and store information on the WWW server via the network. Hence, the user who wants to print given data acquires desired data into the computer, and outputs it to a printer apparatus or the like having a print function to make it print, thus allowing to print various data on the WWW server.

In this way, the conventional apparatus can print information acquired from the WWW server. Upon printing, however, since a fixed image process is always done irrespective of the contents of that information, the user encounters the following shortcomings.

(a) Since an image such as photo data that requires grayscale information, and an image such as an illustration that requires resolution undergo an identical image process, and are then printed, grayscale information of a photo or the like is lost, or the resolution of an image such as an illustration is impaired.

(b) Since gamma conversion is done irrespective of types of images, i.e., an image such as photo data or the like, and an image such as an illustration or the like, images cannot be printed with optimal tinctures according to their types.

(c) Since an image such as photo data or the like, and an image such as an illustration or the like undergo an identical undercolor removal process, images cannot be printed with optimal tinctures.

A certain information apparatus itself having a print function is provided with an access function to WWW servers, and directly accesses a WWW server designated by the user to acquire and print desired data. Also, a printer itself may be added with a function of acquiring data on a WWW server, and may directly acquire and print data on the WWW server.

However, when the printer directly acquires and prints data on the WWW server, since another data acquire instruction cannot be issued to the printer after the user instructs the printer to acquire the former data until the printer has printed this former data, the following shortcomings are posed.

(A) When the data transfer path has low transfer performance, a long time is required for acquiring one data, and another data acquire instruction cannot be issued during that data transfer period.

(B) Even when the WWW server does not start transmission of data for some reason, the printer must wait for the arrival of data.

SUMMARY OF THE INVENTION

The present invention has been made in consideration of the above prior arts, and has as its object to provide an image forming apparatus, which designates a storage address of desired image data, reads out the desired data from the designated address, forms an image of the readout data, and executes an image process corresponding to the type of image data upon forming the image, and an image processing method in the apparatus.

It is another object of the present invention to provide an image forming apparatus which acquires desired data from a network address designated by user operation via a network, and forms an image by executing an image process corresponding to the acquired data, and an image processing method in the apparatus.

It is still another object of the present invention to provide an image forming apparatus which acquires desired data from a network address designated by a client apparatus, connected to a network, via the network, and forms an image by executing an image process corresponding to the acquired data, and an image processing method in the apparatus.

It is still another object of the present invention to provide an image forming apparatus and method, which can start acquisition of another data even when a long time is required until completion of acquisition of given data, which is being acquired.

It is still another object of the present invention to provide an image forming apparatus and method, which can start printing in the order from data which has been acquired earliest irrespective of the order in which data acquisition start was instructed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
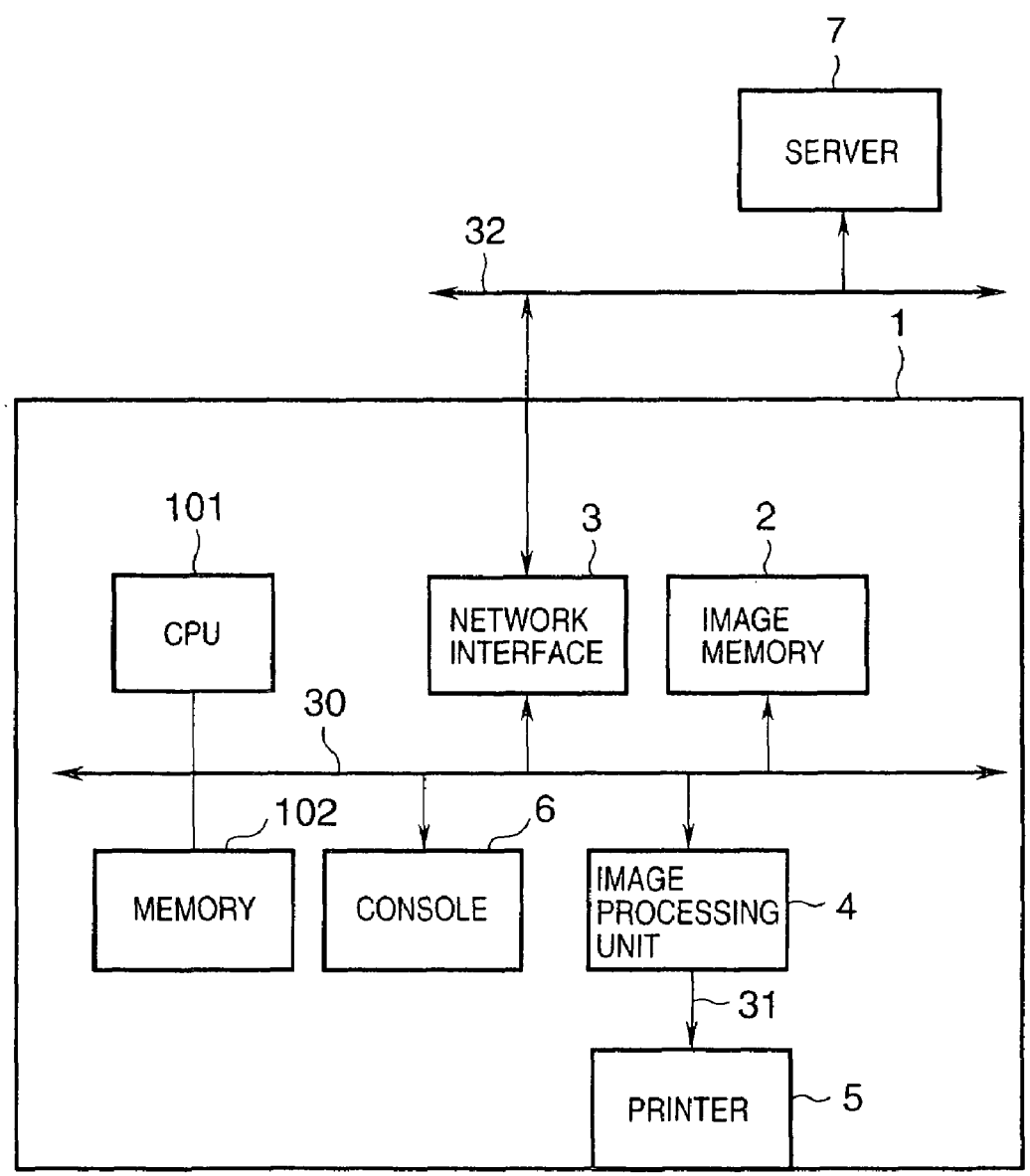
FIG. 1 is a block diagram showing the arrangement of a system including an image forming apparatus according to the first embodiment of the present invention.

Prior to the detailed description of a preferred embodiment of the present invention, characteristic features of this embodiment will be briefly explained.

For example, GIF, JPEG, and the like are the currently prevalent formats of image files on the Internet. Of these formats, the GIF file format saves an image by compressing it by reversible compression, and the number of displayable colors is limited to 256. For this reason, the GIF file format is normally used for image data such as illustrations, figures, and the like, which do not require a large number of colors.

On the other hand, the JPEG file format saves an image by compressing it by irreversible compression, and can display a very large number of colors (approximately 16,770,000 colors). For this reason, the JPEG file format is mainly used for image data of a natural image such as digital photo data or the like.

Upon printing an image by electrophotography or the like, when the resolution of an image to be printed is increased, it becomes difficult to shape the waveform of an analog signal used as a pattern signal in, e.g., pulse-width modulation into an ideal triangular wave, and an image is hard to print with ideal tone.

In this embodiment, an image that demands resolution is printed with high resolution, and an image that demands grayscale information of colors is printed with low resolution.

Furthermore, since image data such as an illustration, figure, or the like, and image data such as a photo, natural image, or the like often use different image emphasis or smoothing setups, this embodiment allows image emphasis or smoothing setups in correspondence with the individual image data formats. In addition, when RGB image data is printed by an electrophotographic printer, RGB image data must be converted into C (cyan), M (magenta), Y (yellow), and K (black) gray levels, and the converted image data must be sent to the printer. In this case, since a gray image printed using C, M, and Y toners has certain color cast, a gray portion is preferably printed using only black (K) toner to obtain a higher-quality image. Conversely, when a gray portion is printed using black toner alone, grayscale information of a reproduced continuous tone image which smoothly changes from gray to another color is lost. For this reason, in such electrophotographic printer, it is a common practice to form an image by combining C, M, and Y toners with K toner at an appropriate ratio. The ratio of CMY to K in this case is called undercolor removal. This embodiments allows undercolor removal setups corresponding to the individual image data formats.

In case of a printer such as an ink-jet printer which cannot vary the area per pixel or can only change the area per pixel by a very limited amount, an image that preserves grayscale information can be printed by changing the number of chromatic pixels per unit area or the combination of those chromatic pixels. Such image expression method is called dot area modulation, and according to this method, image data is converted by a dither process or error diffusion into image data defined by only colors that can be printed by the printer and can be printed in colors approximate to an original image. In such dot area modulation process, since an optimal conversion process is used upon printing image data such as a photo or the like or image data such as an illustration or the like, dot area modulation process setups can be made according to the individual image data formats.

The preferred embodiments of the present invention will be described in detail hereinafter with reference to the accompanying drawings.

First Embodiment

This embodiment will exemplify an image forming apparatus which sends using the HTTP protocol a command to a server, which is designated by the user at a console and holds desired image data, acquires image data held in the server in response to a reply from the server, and forms an image.

FIG. 1 is a block diagram showing the arrangement of an image forming apparatus 1 of this embodiment. The image forming apparatus 1 is connected to a network 32.

Referring to FIG. 1, reference numeral 2 denotes an image memory which holds image data input from the network 32 via a network interface 3. The image memory 2 may comprise a large-capacity storage unit such as a hard disk or the like. The network interface 3 controls via the network 32 communications with another apparatus connected to this network. Reference numeral 4 denotes an image processing unit which performs various image processes for image data stored in the image memory 2, and outputs processed image data to a printer 5. The printer 5 serves as an image forming means for forming an image on a recording medium such as a paper sheet by receiving image data from the image processing unit 4. Reference numeral 6 denotes a console which is operated by the operator and is used to designate a holding location (server or the like) of image data to be printed using the printer 5. Reference numeral 7 denotes a server which is connected to the network 32, and holds various image data. Reference numeral 30 denotes a system bus which exchanges data between a CPU 101 for controlling the operation of the overall image forming apparatus 1 and the individual units. Reference numeral 31 denotes a video bus which is used to transfer image data generated by the image processing unit 4 to the printer 5. The network 32 is a communication path which connects the image forming apparatus 1 and server 7 to each other, and exchanges various data between these apparatuses. Reference numeral 102 denotes a memory which stores a program executed by the CPU 101, and is also used as a work area for temporarily storing various data and the like upon operation of the CPU 101.

The HTTP protocol will be explained below.

The HTTP protocol is a service on the TCP/IP protocol, which is used to transfer data described in HTML (Hyper- Text Markup Language), image data, and the like. This protocol is normally used in a system which connects a client computer that submits a data transfer request, and a server that holds data, via the network.

On the client computer, an HTTP client is launched, and the user inputs at the HTTP client the location of data on the server using a designation format called a URL (Uniform Resource Locator) for designating the holding location of the data. The HTTP client then submits an information transfer request to the server in accordance with the input.

The HTTP protocol includes a GET command as a command for requesting data, and a HEAD command as a command for requesting associated information that pertains to the data. It is a common practice to check the type of data to be acquired in advance using the HEAD command, to acquire the data using the GET command, and to process based on the acquired data.

The associated information that can be acquired by the HEAD command includes format information of given data in addition to the size and updated date information of that data. The data format information is called "Content-type". With this information, since an extension such as "text/html" for data described in, e.g., HTML, "image/gif" for GIF image data, "image/jpeg" for JPEG image data, or the like is appended, the type of data can be determined based on the extension.

Assuming that the host name of the server 7 is "host.co.jp" and the location of data to be acquired on that server is "pub/image.GIF", by inputting URL "http://host.co.jp/pub/image.GIF", the HTTP client submits a HEAD command for "/pub/image.GIF" to the server "host.co.jp".

Upon receiving this command, the server 7 sends data format information of "/pub/image.GIF" to the HTTP client, that has submitted the HEAD command, as a reply to that HEAD command.

Upon receiving the reply of the HEAD command, the HTTP client then submits a GET command for "/pub/image.GIF" to the server "host.co.jp".

Upon receiving the GET command, the server 7 sends data at "/pub/image.GIF" to the HTTP client, that has submitted the GET command as a reply, to that GET command.

Upon receiving the reply of the GET command, the HTTP client can receive the format information received as a reply to the HEAD command, and the data at "/pub/image.GIF", and can process the received data.

In this manner, the HTTP client can acquire designated data stored in the designated server 7 on the basis of the URL input at the console 6 together with its associated information. Note that the flow of this process will be described later with reference to the flow chart in FIG. 4.

The arrangement of the image processing unit 4 of this embodiment will be described below.

Figure 2:
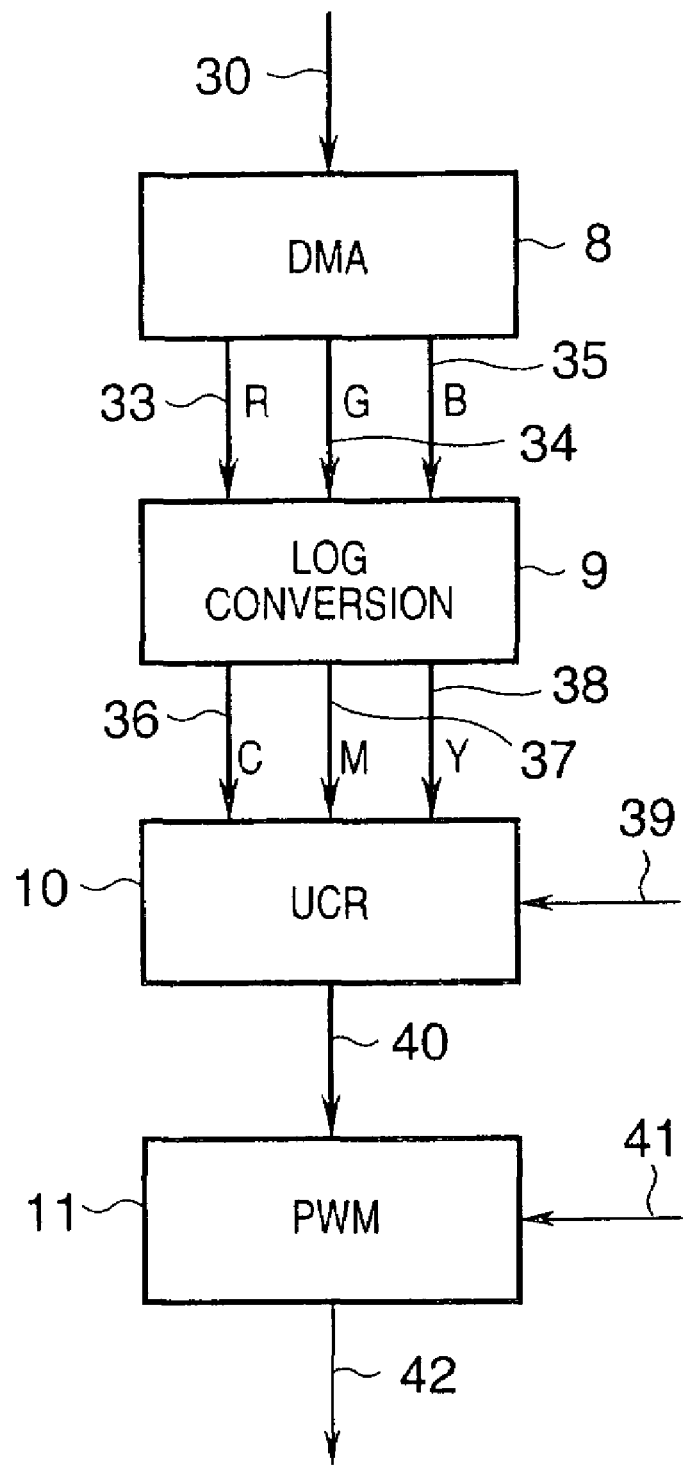
FIG. 2 is a block diagram showing the arrangement of an image processing unit of the first embodiment.

FIG. 2 is a block diagram showing the arrangement of the image processing unit 4.

Referring to FIG. 2, reference numeral 8 denotes a DMA data transfer circuit which makes DMA transfer control of image data from the image memory 2 to the image processing unit 4. Reference numeral 9 denotes a LOG conversion circuit for converting RGB image data into CMY image data. Reference numeral 10 denotes a UCR circuit for generating CMYK data 40 by performing a UCR process for the CMY image data. Reference numeral 11 denotes a PWM (pulse-width modulation) circuit for generating a laser drive signal 42 for performing laser ON/OFF control on the basis of the CMYK image data.

Reference numeral 33 denotes an R data signal indicating red component data of image data; 34, a G data signal indicating green component data of image data; 35, a B data signal indicating blue component data of image data; 36, a C data signal indicating cyan component data of image data; 37, an M data signal indicating magenta component data of image data; 38, a Y data signal indicating yellow component data of image data; and 39, a color select signal for selecting a color which is to undergo image formation. Reference numeral 40 denotes a data signal selected in accordance with the color select signal 39 of the C, M, Y, and K data; 41, a clock signal as a reference sync signal for a PWM process; and 42, a laser drive signal for performing laser ON/OFF control.

The DMA data transfer circuit 8 is connected to the system bus 30, and is controlled via the system bus 30 by the CPU 101 that controls the overall image forming apparatus 1. When image data held in the image memory 2 is transferred to the image processing unit 4 under the control of the DMA data transfer circuit 8, the CPU 101 sets the addresses of R, G, and B image data held in the image memory 2 and the data size to be DMA-transferred in the DMA data transfer circuit 8. After that, the DMA data transfer circuit 8 sequentially reads out R, G, and B data from the designated addresses of the image memory 2 by DMA and outputs the readout data as the R, G, and B data signals 33, 34, and 35 to the LOG conversion circuit 9. These three R, G, and B data are synchronously output to the LOG conversion circuit 9. That is, R, G, and B data of each pixel of image data are simultaneously output.

The C, M, and Y data signals 36, 37, and 38 are generated and output by LOG operations based on the R, G, and B data signals 33, 34, and 35 input to the LOG conversion circuit 9. In this process, luminance data of R, G, and B data are converted into grayscale data of C, M, and Y data.

The C, M, and Y data signals 36, 37, and 38 output from the LOG conversion circuit 9 are input to the UCR circuit 10. The UCR circuit 10 extracts and outputs a black component as a common component from the C, M, and Y data. Black component extraction is implemented as follows. That is, a color having a minimum value of C, M, and Y data is determined for each pixel, and the minimum value is multiplied by a pre-set coefficient to determine a K data value serving as black toner data. Then, the K data value is subtracted from the C, M, and Y data to compute C, M, and Y data values which are actually used in image formation.

For example, when a generation coefficient of black toner data is 80%, C=20, M=90, and Y=100, since the minimum value is "20", image data is generated as follows:

C': 4 (C−K)
M': 74 (M−K)
Y': 84 (Y−K)
K: 16 (20×80%=16)

The UCR circuit 10 also receives the color select signal 39, which is required since the printer 5 uses an image formation method for sequentially forming C, M, Y, and K images in units of colors, and selects one of C', Y', M', and K image data to be output upon forming C, M, Y, and K images.

In response to this color select signal 39, one of C', Y', M', and K data is output as the data signal 40.

The data signal 40 output from the UCR circuit 10 is pulse-width-modulated by the clock signal 41 as a triangular wave by the PWM circuit 11. With this pulse-width modulation, the data signal 40 input as, e.g., 8-bit data is converted into the pulse signal 42, which is modulated to have a pulse width corresponding to the value of the data signal 40 in synchronism with the clock signal 41. Also, the PWM circuit 11 can frequency-divide the input clock signal 41 by 2, and can implement PWM at a twice frequency of the clock signal 41.

The arrangement of the printer 5 of this embodiment will be described below.

Figure 3:
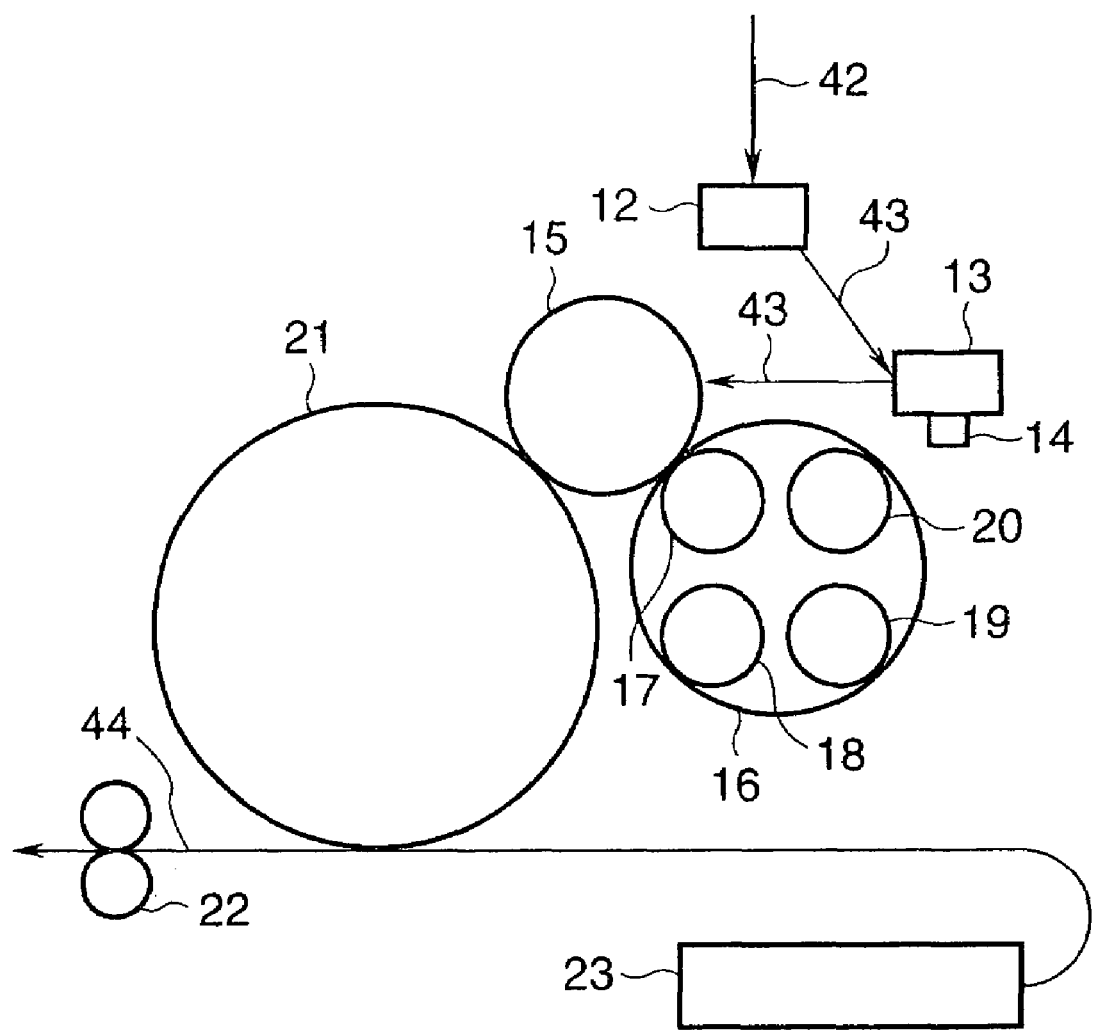
FIG. 3 is a block diagram showing the arrangement of a printer of the first embodiment.

FIG. 3 is a block diagram showing the arrangement of the printer 5 of this embodiment.

Referring to FIG. 3, reference numeral 12 denotes a semiconductor laser for outputting a laser beam in accordance with the input pulse signal 42. Reference numeral 13 denotes a polygonal mirror, the side surfaces of which define a hexagon and have undergone mirror-surface polishing, and which rotates upon driving a polygonal motor 14. Reference numeral 15 denotes a developer on which a latent image formed by a laser beam, and a toner image is formed by attracting toner on that latent image. Reference numeral 16 denotes a revolver which holds C, M, Y, and K toner cartridges, and rotates in correspondence with the color to be developed. Reference numeral 17 denotes a C (cyan) toner cartridge; 18, an M (magenta) toner cartridge; 19, a Y (yellow) toner cartridge; and 20, a K (black) toner cartridge. Reference numeral 21 denotes a transfer drum which attracts a paper sheet, and transfers the toner image on the developer 15 onto the paper sheet. Reference numeral 22 denotes fixing drums for fixing the toner image on the paper sheet; 23, a paper cassette which holds paper sheets, and supplies a paper sheet upon image formation; 42, a laser drive signal; 43, a laser beam emitted by the semiconductor laser 12; and 44, a paper convey path.

This printer 5 forms an image on a paper sheet by electrophotography using four color toners, i.e., C (cyan), M (magenta), Y (yellow), and K (black) toners. Upon forming an image, a paper sheet stored in the paper cassette 23 is fed, is conveyed along the paper convey path 44, and is attracted by the transfer drum 21 and becomes attached to its surface. The transfer drum 21 rotates at a constant velocity, and the paper sheet moves upon rotation of this transfer drum 21.

On the other hand, upon printing by the printer 5, the laser drive pulse signal 42 is supplied from the image processing unit 4. The pulse signal 42 to be supplied is one of C, M, Y, and K data signals that have undergone PWM by the PWM circuit 11, and a C pulse signal 42 is input first. While this pulse signal 42 is ON, a laser beam source of the laser 12 emits a laser beam 43. The output laser beam 43 strikes the polygonal mirror 13. The polygonal mirror 13 is rotated by the polygonal motor 14, and the laser beam 43 scans the developer 15 from one end to another upon rotation of the mirror 13. This single scan forms one scan line in image formation. Upon scanning of the laser beam 43, a latent image is formed on the developer 15. This latent image has electrical characteristics in which those portions that are irradiated with the laser beam 43 have high potential, and the remaining portions low potential.

A cyan latent image formed first on the developer 15 contacts negatively charged cyan toner stored in the C toner cartridge 17 at a contact position between the developer 15 and C toner cartridge 17, which is set in advance at a contact position between the revolver 16 and developer 15. This cyan toner is attracted by only that portion of the developer 15, which is irradiated with the laser beam 43, by electric attraction force and is developed in that portion. That portion of the developer 15, which has attracted toner moves to a contact position to the transfer drum 21 upon rotation of the developer 15. At the contact position of the transfer drum 21 and developer 15, the cyan toner attracted by the developer 15 is transferred onto the paper sheet attracted on the transfer drum 21. Then, the revolver 16 is rotated ¼ so that the M toner cartridge 18 contacts the developer 15, a magenta latent image is formed on the developer 15 by a pulse signal 42 according to a magenta image signal, and a magenta toner image is formed on the paper sheet in the same manner as development of the cyan image.

Likewise, development processes using Y and K toners are done, and C, M, Y, and K toner images are transferred onto the paper sheet attracted on the transfer drum 21.

After that, the paper sheet is separated from the transfer drum 44, and passes through the gap between the two fixing drums 22 along the paper convey path 44. In this case, the toner images transferred onto the paper sheet are fixed by heat and pressure applied by the fixing drums 22, and the paper sheet is discharged outside the printer 5. With these operations, a print process is executed.

The processing operation in the image forming apparatus 1 of this embodiment will be described below with reference to the flow chart shown in FIG. 4.

Figure 4:
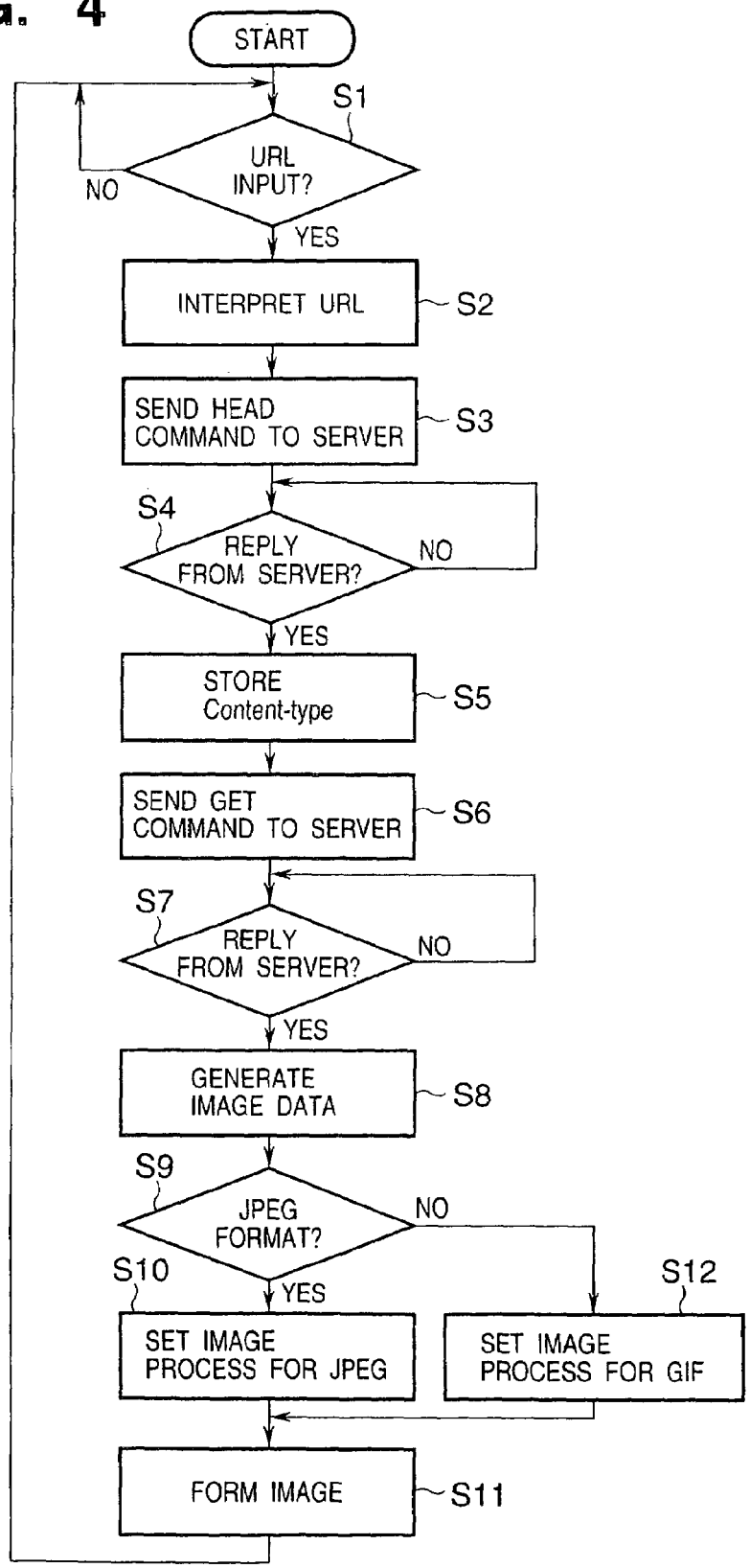
FIG. 4 is a flow chart for explaining the process in the image forming apparatus according to the first embodiment of the present invention.

FIG. 4 is a flow chart showing the control process executed by the CPU 101 in the image forming apparatus of this embodiment, and a program that implements this process is stored in the memory 102.

The image forming apparatus 1 has the console 6, which comprises buttons, indicators, and the like, and is used by the user to operate the image forming apparatus 1. The user designates a location (URL) of data to be printed at the console 6. The image forming apparatus 1 stands by until this input is made (step S1). If a URL is input in step S1, the flow advances to step S2, and the input URL structure is interpreted to specify the address of a server that holds desired data, and the location of data to be acquired in the server. In this embodiment, assume that the server 7 holds data to be acquired.

The flow then advances to step S3, and a HEAD command for the data to be acquired is submitted to the server 7. The HEAD command is sent to the server 7 via the network interface 3 and network 32.

Upon receiving the HEAD command, the server 7 generates format information as a reply to the HEAD command on the basis of information that pertains to the designated data, and sends it back to the image forming apparatus 1 via the network 32 and the network interface 3. Upon receiving the format information from the server 7 in step S4, the flow advances to step S5 to extract and store "Content-type" information from the format information from the server 7.

The flow advances to step S6, and a GET command for the data to be acquired is submitted to the server 7. The GET command is submitted to the server 7 via the network interface 3 and network 32.

In response to this command, the server 7 sends the data designated by the GET command to the image forming apparatus 1 via the network 32 and network interface 3.

Upon receiving a reply from the server 7, the flow advances from step S7 to step S8, and image data is generated on the image memory 2 on the basis of the data received from the server 7. The flow advances to step S9, and if it is determined in step S9 that the "Content-type" information stored in step S5 indicates a JPEG image, the flow advances to step S10; otherwise, the flow advances to step S12. In step S10, image processes for a JPEG image are set up in the image processing unit 4. That is, UCR=80% is set in the UCR circuit 10, and PWM at a ½ period (twice frequency) of that of the clock signal 41 is set in the PWM circuit 11.

On the other hand, if it is determined in step S9 that the "Content-type" information does not indicate a JPEG format, the flow advances to step S12, and image processes for a GIF image are set up in the image processing unit 4. That is, UCR=100% is set in the CRT circuit 10, and PWM at the frequency of the clock signal 41 is set in the PWM circuit 11. In this manner, after the image processes and PWM are executed in step S10 or S12, the printer 5 forms an image on the basis of the image data that has undergone the image and PWM processes in step S11.

As described above, an image can be formed on the basis of image data stored in the server 7 designated at the console 6.

With the aforementioned process, since black components are extracted from a JPEG image at UCR=80%, an image with a smoothly reproduced tone pattern that changes from black to another color can be formed. Also, since PWM is done at twice frequency of the clock signal 41, an image that can satisfactorily preserve grayscale information can be generated.

As for a GIF image, since black components are extracted at UCR=100%, a light gray image is formed by black toner alone, and a problem posed in an image generated by mixing C, M, Y, and K, i.e., that gray is not the one defined by pure black, can be avoided.

Also, since PWM is done at the same frequency as the clock signal 41, a high-resolution image that suffers less jaggies can be formed.

As described above, according to the first embodiment, a JPEG image undergoes an image process suitable for printing a natural image such as a photo or the like, and is then formed. On the other hand, a GIF image undergoes an image process suitable for printing an illustration or the like, and is then formed.

The effects unique to the first embodiment are as follows.

(1) Since the storage location of data to be acquired is designated at the console 6 of the image forming apparatus 1, an image process and image formation process can be done by the image forming apparatus 1 alone, and the need for another client apparatus can be obviated.

(2) Since the storage location of data to be acquired is designated at the console 6 of the image forming apparatus 1, communication software can be simple, and can be easily developed.

(3) Since "Content-type" is inquired of the server, and the image format is determined based on a reply to that inquiry, a print process can be normally done even when no extension of a URL is available.

Second Embodiment

The second embodiment will explain an image forming apparatus which acquires desired data using the HTTP protocol on the basis of a URL input at another device connected to the network 32, and forms an image by generating image data on the basis of the acquired data.

In the second embodiment, the storage location information of data to be acquired is input as a URL from a client apparatus 24 (FIG. 5) connected to the network 32, the input URL information is sent to the image forming apparatus 1, and the image forming apparatus acquires data from the server 7 based on the input URL and forms an image.

Figure 5:
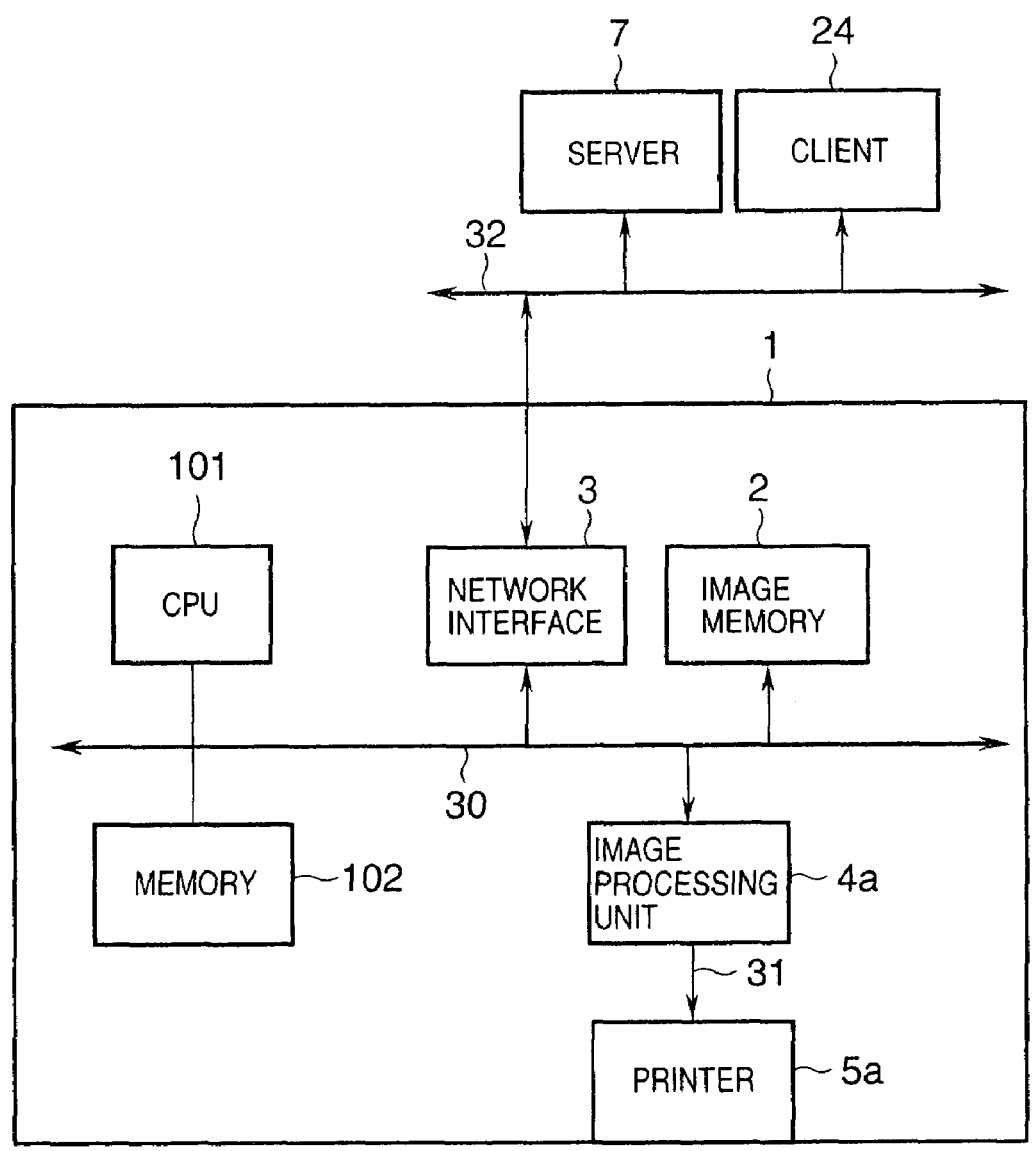
FIG. 5 is a block diagram showing the arrangement of a system including an image forming apparatus according to the second embodiment of the present invention.

FIG. 5 is a block diagram showing the overall arrangement of a network system including the image forming apparatus 1 according to the second embodiment of the present invention. The same reference numerals in FIG. 5 denote the same parts as those in FIG. 1, and a detailed description thereof will be omitted.

Referring to FIG. 5, reference numeral 24 denotes a client apparatus having a function of designating data which is to be acquired by the image forming apparatus 1 upon forming an image. Reference numeral 4a denotes an image processing unit which implements basically the same functions as those of the aforementioned image processing unit 4. The arrangement of the image processing unit 4a will be described later with reference to FIG. 6. Reference numeral 5a denotes a printer, the details of which will be described later with reference to FIG. 7.

Figure 6:
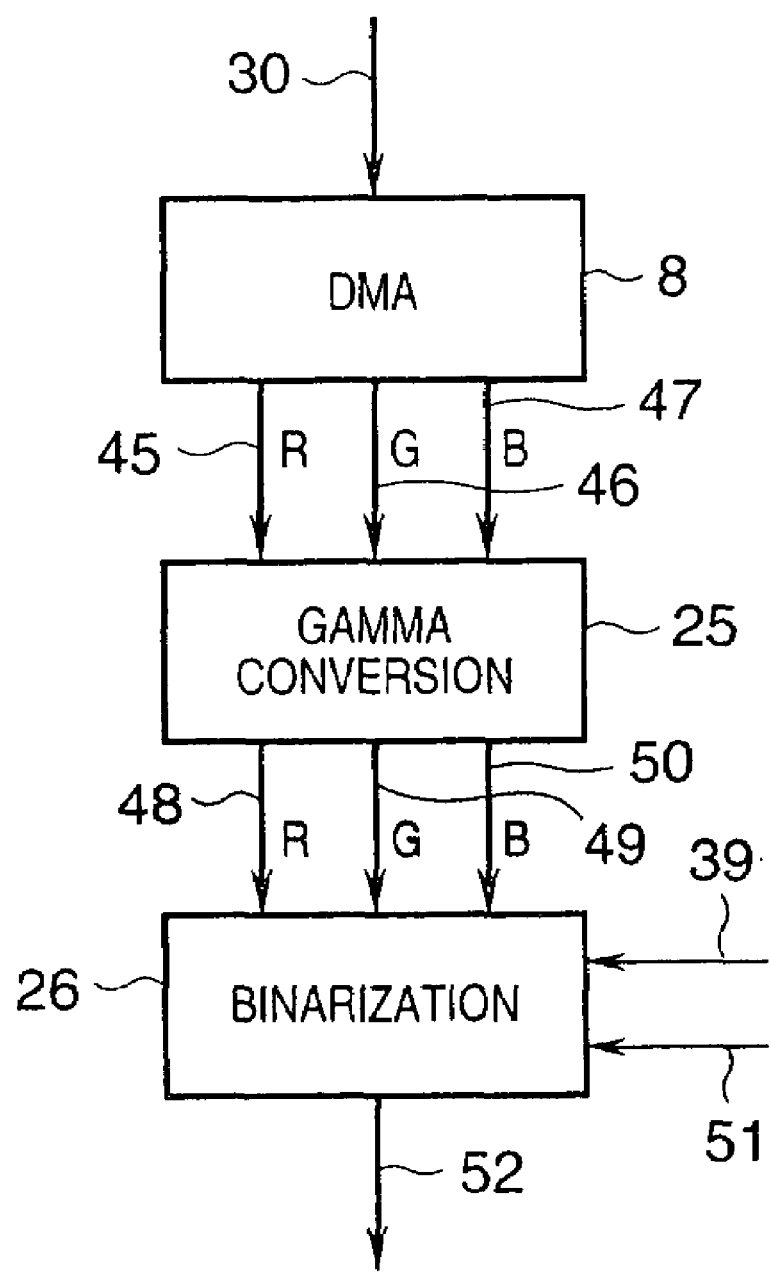
FIG. 6 is a block diagram showing the arrangement of an image processing unit of the second embodiment.

FIG. 6 is a block diagram showing the arrangement of the image processing unit 4a of the second embodiment, and the same reference numerals in FIG. 6 denote the same parts as those in FIG. 2.

Referring to FIG. 6, reference numeral 8 denotes a DMA data transfer circuit for controlling DMA transfer of image data from the image memory 2; 25, a gamma conversion circuit for performing gamma conversion; and 26, a binarization circuit for binarizing input image data to generate binary data. Reference numeral 45 denotes an R data signal indicating red component data of image data; 46, a G data signal indicating green component data of image data; 47, a B data signal indicating blue component data of image data; 48, an R data signal converted by the gamma conversion circuit 25; 49, a G data signal converted by the gamma conversion circuit 25; and 50, a B data signal converted by the gamma conversion circuit 25. Reference numeral 39 denotes a color select signal for selecting a color which is to undergo image formation; 51, a binarization method select signal for selecting a binarization method in the binarization circuit 26; and 52, an LED drive signal for ON/OFF control of an LED array.

The DMA data transfer circuit 8 is connected to the system bus 30, and is controlled via the system bus 30 by the CPU 101 that controls the overall image forming apparatus 1. When image data held in the image memory 2 is transferred to the image processing unit 4a by DMA transfer of the DMA data transfer circuit 8, the CPU 101 sets the addresses of R, G, and B image data held in the image memory 2 and the data size to be transferred in the DMA data transfer circuit 8. After that, the DMA data transfer circuit 8 sequentially reads out R, G, and B data from the designated addresses of the image memory 2 by DMA and outputs the readout data as the R, G, and B data signals 45, 46, and 47 to the gamma conversion circuit 25. At this time, R, G, and B data are synchronously output. That is, R, G, and B data of each pixel are simultaneously output.

The R, G, and B data signals 45, 46, and 47 input to the gamma conversion circuit 25 are gamma-converted on the basis of a pre-set gamma conversion table, so as to generate and output the R, G, and B data signals 48, 49, and 50 respectively from the R, G, and B data signals 45, 46, and 47. The R, G, and B data signals 48, 49, and 50 output from the gamma conversion circuit 25 are input to the binarization circuit 26. The binarization circuit 26 selects one of the input data signals to be output on the basis of the color select signal 39, and determines the binarization method to be used on the basis of the binarization method select signal 51. In the second embodiment, the binarization circuit 26 can select one of dithering and error diffusion.

Dithering generates data for image formation by converting luminance data into a binary pattern on the basis of a binary pattern that expresses a gray level corresponding to each luminance data as a dot area. Dithering is a binarization method suitable for printing an illustration, figure, character, and the like, which have small tone changes and clear region boundaries.

On the other hand, error diffusion is a binarization method for binarizing a given pixel on the basis of original data of the pixel to be binarized, original data of binarized surrounding pixels, errors from data generated by binarization, and a random number. This method is suitable for, e.g., a natural image having many tone changes.

The binarized image data is output to the printer 5a as the LED drive signal 52.

Figure 7:
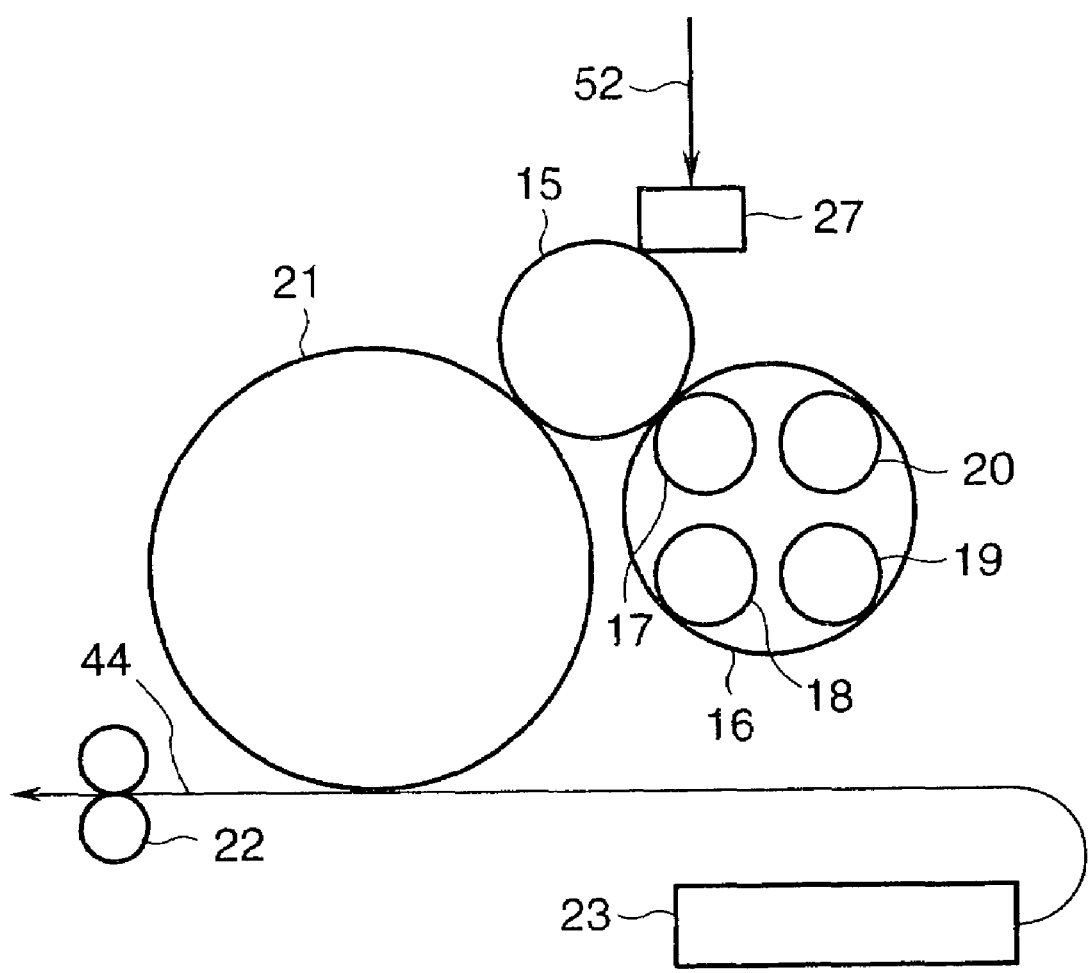
FIG. 7 is a block diagram showing the arrangement of a printer of the second embodiment.

FIG. 7 is a block diagram showing the arrangement of the printer 5a of the second embodiment, and the same reference numerals in FIG. 7 denote the same parts as those in FIG. 3.

Referring to FIG. 7, reference numeral 27 denotes an LED array in which individual elements emit light in response to the LED drive signal 52; 15, a developer on which a latent image is formed by turning on the individual elements of the LED array 27, and a toner image is formed by attracting toner on that latent image; 16, a revolver which holds C, M, Y, and K toner cartridges, and rotates in correspondence with the color to be developed. Reference numeral 17 denotes a C (cyan) toner cartridge; 18, an M (magenta) toner cartridge; 19, a Y (yellow) toner cartridge; and 20, a K (black) toner cartridge. Reference numeral 21 denotes a transfer drum which attracts a paper sheet, and transfers the toner image on the developer 15 onto the paper sheet. Reference numeral 22 denotes fixing drums for fixing the toner image on the paper sheet; 23, a paper cassette which holds paper sheets, and supplies a paper sheet upon image formation; 52, an LED drive signal; and 44, a paper convey path.

This printer 5a forms a color image on a paper sheet by electrophotography using four color toners, i.e., C (cyan), M (magenta), Y (yellow), and K (black) toners. Unlike the aforementioned laser printer, the printer 5a uses the LED array 27 to develop images.

Upon forming an image, one of paper sheets stacked in the paper cassette 23 is fed, is conveyed along the paper convey path 44, and is attracted by the transfer drum 21 and becomes attached to its surface. The transfer drum 21 rotates at a constant velocity, and the paper sheet moves upon rotation of this transfer drum 21. Upon printing by the printer 5a, the LED drive signal 52 is supplied from the image processing unit 4a. The LED drive signal 52 to be supplied is one of C, M, Y, and K data signals generated by the binarization process of the binarization circuit 26, and a C image signal is input first.

In the LED array 27, LEDs line up in correspondence with the width of the developer 15, and one LED has a size corresponding to the width of one pixel. When the LED drive signal 52 supplies image data for one scan line to be developed, a latent image for one scan line is formed by emitting light by the LEDs. LEDs corresponding to ON bits of the LED drive signal 52 are turned on to form high potential on the developer 15, and LEDs corresponding to the remaining bits are kept OFF to form low potential on the developer 15, thus forming a latent image.

A latent image formed on the developer 15 contacts negatively charged cyan toner stored in the C toner cartridge 17 at a contact position between the developer 15 and C toner cartridge 17, which is set in advance at the contact position between the revolver 16 and developer 15. The cyan toner is attracted by only that portion of the developer 15, which is irradiated with light emitted by the LED array, by electric attraction force, and is developed in that portion. That portion of the developer 15, which has the attracted toner moves to a contact position to the transfer drum 21 upon rotation of the developer 15. At the contact position of the transfer drum 21 and developer 15, the toner attracted by the developer 15 is transferred onto the paper sheet attracted on the transfer drum 21.

Subsequently, the revolver 16 is rotated ¼ the perimeter so that the M toner cartridge 18 contacts the developer 15. An M LED drive signal 52 is input to the LED array 27, and a magenta toner image is transferred onto the paper sheet as in the C development process. Upon developing the individual colors, the color select signal 39 is set to output C image data as an LED drive signal 52 upon developing C, and is set to output M, Y, and K image data as LED drive signals 52 upon developing M, Y, and K, respectively. Likewise, Y and K development processes are done, and C, M, Y, and K toner images are transferred onto the paper sheet attracted on the transfer drum 21.

Then, the paper sheet is separated from the transfer drum 21, and passes through the gap between the two fixing drums 22 along the paper convey path 44. In this case, since the toner images transferred onto the paper sheet are fixed by heat and pressure applied by the fixing drums 22, and the paper sheet is discharged outside the printer 5a. With these operations, a print process is executed.

Figure 8:
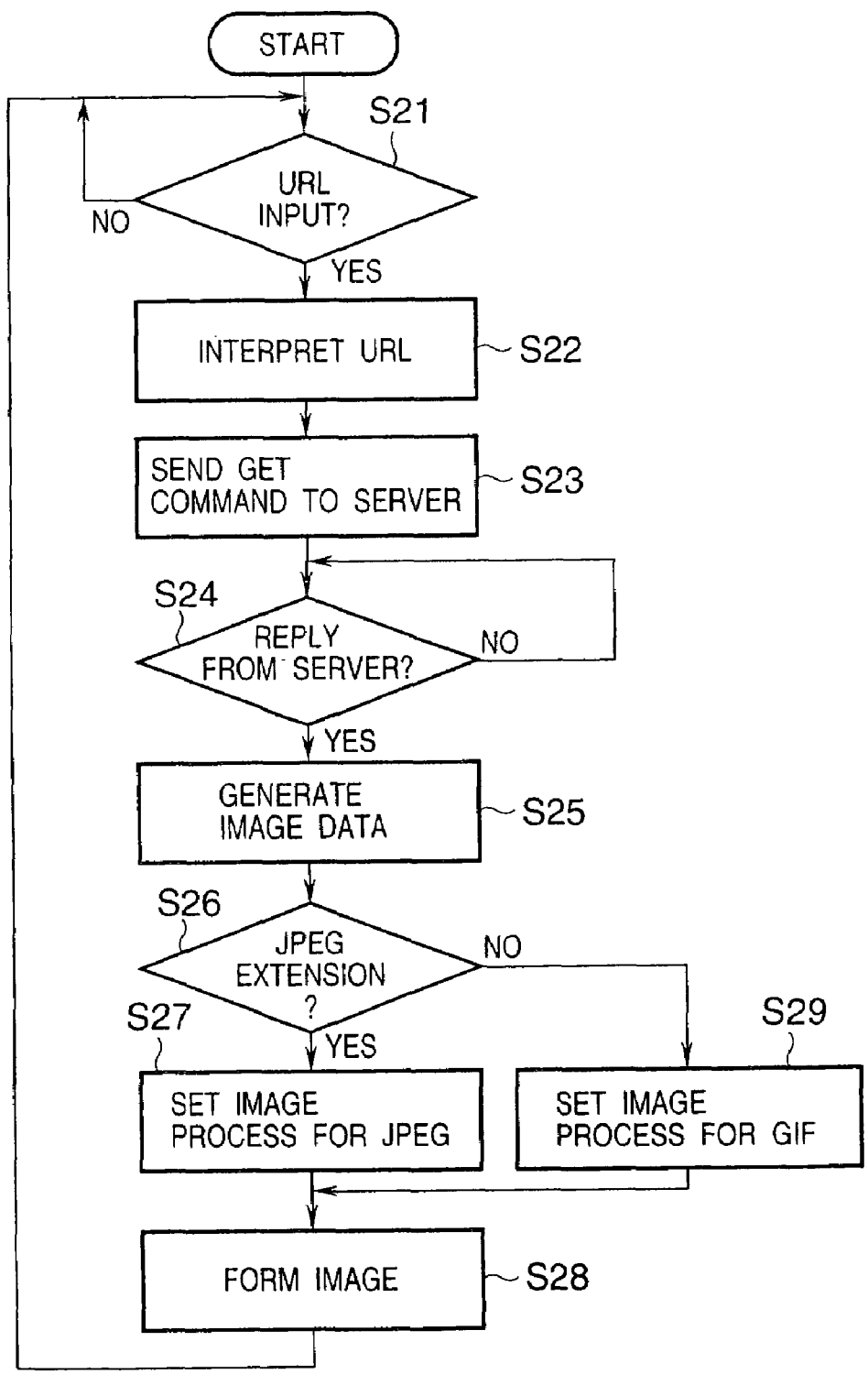
FIG. 8 is a flow chart for explaining the process in the image forming apparatus according to the second embodiment of the present invention.

FIG. 8 is a flow chart showing the process executed in the image forming apparatus 1 of the second embodiment, and a control program that implements this process is stored in the memory 102.

As shown in FIG. 5, the image forming apparatus 1 of the second embodiment is connected to the client apparatus 24 via the network 32. This client apparatus 24 is a data processing apparatus such as a personal computer, the user of which can input a character string. The user inputs data for designating data to be printed by the image forming apparatus 1 at the client apparatus 24. This data format is a URL as in the first embodiment mentioned above.

After the URL is input, the user of the client apparatus 24 submits the input URL to the image forming apparatus 1 via the network 32. The submitted URL is received by the image forming apparatus 1 via the network 32 and network interface 3. The image forming apparatus 1 stands by until this input is made (step S21). If the URL is input in step S21, the flow advances to step S22, and the input URL structure is interpreted to specify the address of a server that holds desired data, and the location of data to be acquired in the server. In the second embodiment, assume that the server 7 holds data to be acquired.

The flow then advances to step S23, and a GET command for the data to be acquired is submitted to the server 7. The HEAD command is submitted to the server 7 via the network interface 3 and network 32.

In response to this command, the server 7 sends the data designated by the GET command to the image forming apparatus 1 via the network 32 and network interface 3.

Upon receiving a reply from the server 7, the flow advances from step S24 to step S25, and image data is generated on the image memory 2 on the basis of the data received from the server 7. The flow advances to step S26 to check if the extension of the URL interpreted in step S22 is the one such as ".JPG", ".jpeg", or the like, which indicates a JPEG image. If the extension indicates a JPEG image, the flow advances to step S27, and image processes for a JPEG image are set up in the image processing unit 4a. That is, a gamma table for a natural image is set in the gamma conversion circuit 9, and error diffusion is set as the binarization method of the binarization circuit 10.

On the other hand, if it is determined in step S26 that the extension does not indicate a JPEG format, the flow advances to step S29, and image processes for a GIF image are set up in the image processing unit 4a. That is, a gamma conversion table for an illustration is set in the gamma conversion circuit 9, and dithering is set as the binarization method of the binarization circuit 10. After the image and binarization processes are executed in step S27 or S29, the flow advances to step S28, and the printer 5a forms an image on the basis of image data that have undergone the image and binarization processes. In this manner, a process for forming an image on the basis of data stored in the server 7 designated by the client apparatus 24 is completed.

With the aforementioned process, since a JPEG image undergoes gamma conversion for a natural image, and is binarized by error diffusion, an image can be formed with tinctures and binary patterns suitable for a natural image.

On the other hand, since a GIF image undergoes gamma conversion for an illustration, and is binarized by dithering, an image can be formed with tinctures and binary patterns suitable for an illustration.

As described above, according to the second embodiment, a JPEG image undergoes an image process suitable for printing a natural image such as a photo or the like, and is then formed. On the other hand, a GIF image undergoes an image process suitable for printing an illustration or the like, and is then formed.

The effects unique to the second embodiment are as follows.

(1) Since the storage address of desired data can be designated at the client apparatus, the need for a console for designating an address in the image forming apparatus 1 can be obviated, and a cost reduction of the image forming apparatus 1 can be achieved.

(2) An appropriate binarization process can be done in correspondence with the types of images.

(3) Since the type of image is determined by the extension of the URL, this embodiment can be applied to protocols other than the HTTP protocol.

In the above description, the first and second embodiments have been independently explained. However, the present invention is not limited to those specific embodiments, and the embodiments may be combined as needed. For example, the printer 5a of the second embodiment may be used in the fist embodiment, and the image processing unit 4 of the first embodiment may further include the functions of the image processing unit 4a of the second embodiment. Also, both the image processing units 4 and 4a may have only some of the image processing functions shown in FIGS. 2 and 6 in place of all of them. Furthermore, the printers 5 and 5a in the first and second embodiment may be identical ones, or the first embodiment may use the printer 5a and the second embodiment may use the printer 5. In such case, the image processing units 4 and 4a are used in correspondence with these printers.

Third Embodiment

The third embodiment proposes an image forming apparatus which acquires another data even when a long time is required for acquiring specific data on a server, and forms images in the order from data which has been acquired earliest irrespective of the order in which data acquisition start was instructed.

For example, there is provided an image forming apparatus which can start acquiring another data even when a long time is required, until current data acquisition is completed, for the following factors:

(a) a server that holds data has low data transfer performance;

(b) data acquisition requests from other clients are concentrated on a server that holds data, and data transfer to each client requires a long time; and (c) the data transfer path has low transfer performance, and can start image formation in turn from data that has been acquired earliest irrespective of the order in which data acquisition start was instructed.

Figure 9:
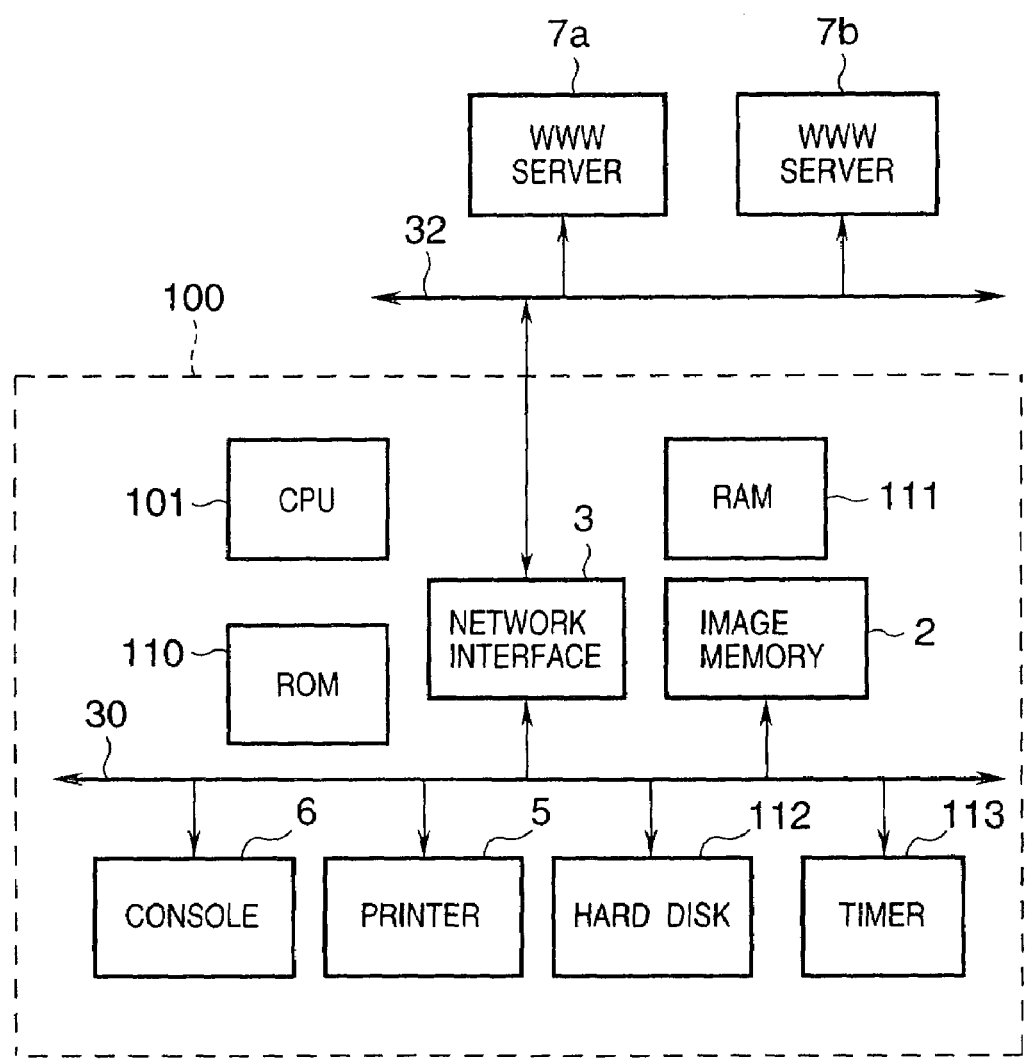
FIG. 9 is a block diagram showing the arrangement of a system including an image forming apparatus according to the third embodiment of the present invention.

FIG. 9 is a block diagram showing the network arrangement which includes an image forming apparatus 100 according to the third embodiment of the present invention, and WWW servers. The same reference numerals in FIG. 9 denote the same parts as those in the above embodiments, and a detailed description thereof will be omitted.

Referring to FIG. 9, reference numeral 100 denotes an image forming apparatus according to the third embodiment; 2, an image memory for holding image data; 112, a hard disk for holding a large number of image data and HTML data; 113, a timer for measuring time in response to an instruction of a CPU 101; 3, a network interface for communicating with other apparatuses connected to the network 32; and 5, a printer for forming an image on a paper sheet on the basis of image data. Reference numeral 6 denotes a console which has buttons for designating a location of data, and inputting data acquisition start and cancel instructions, and a display for displaying information. Reference numerals 7a and 7b denote WWW servers which hold HTML data and send the held HTML data to a client in response to a request from the client. In this embodiment, the WWW server 7a has a host name "www.aaa.co.jp", and the WWW server 7b has a host name "www.bbb.com" for the sake of simplicity. Reference numeral 101 denotes a CPU for controlling the overall image forming apparatus 100; 110, a ROM for holding a program for operating the CPU 101; and 111, a RAM used as a work area of the CPU 101.

Figure 10:
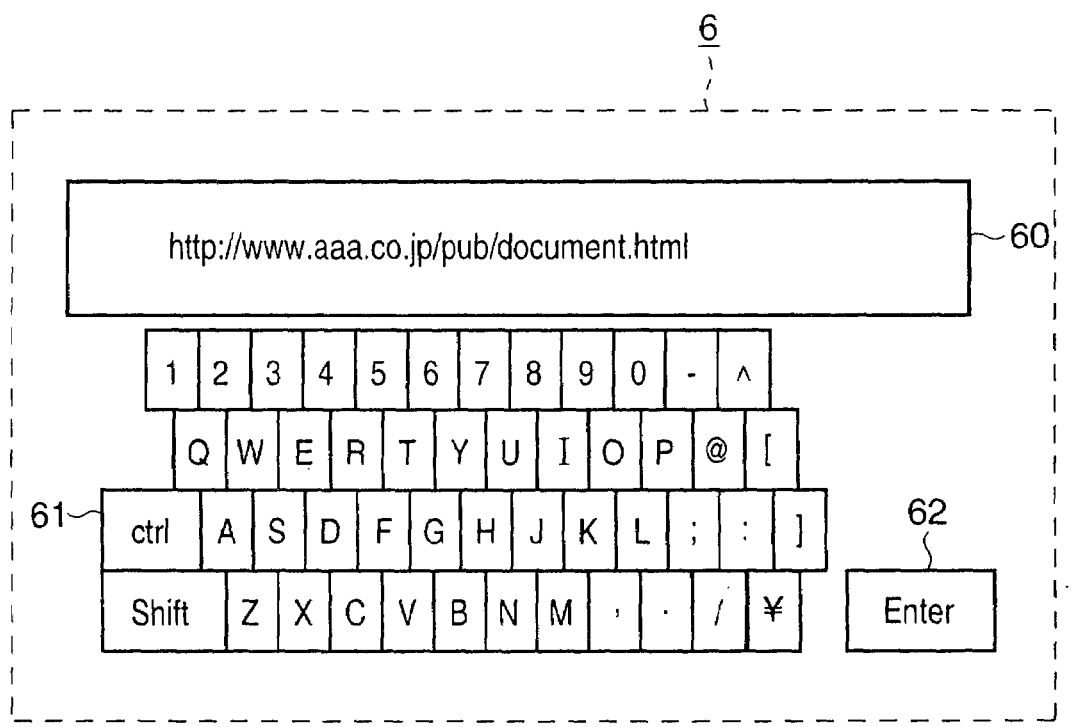
FIG. 10 is a plan view of a console of the third embodiment.

FIG. 10 shows the outer appearance of the console 6.

Referring to FIG. 10, reference numeral 60 denotes a display which comprises a liquid crystal display to display an input character string; 61, a keyboard for inputting a character string; and 62, an input key (Enter key) used to notify the end of input of a character string.

Figure 11:
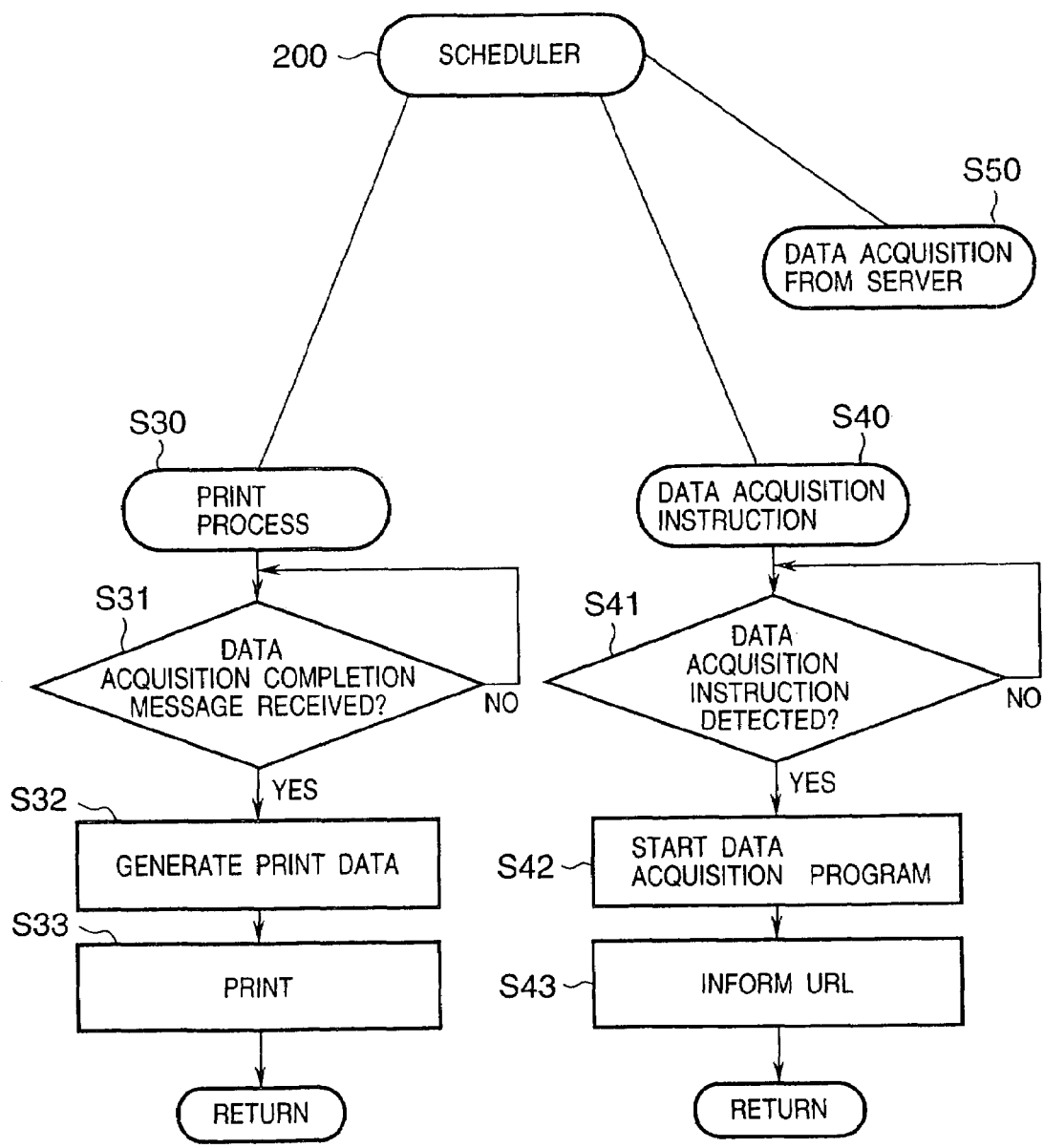
FIG. 11 is a flow chart for explaining the program architecture of the image forming apparatus of the third embodiment.

FIG. 11 is a flow chart showing the schematic configuration of a control program processed by the CPU 101 of the image forming apparatus 100 according to the third embodiment. This control program is composed of multi-task programs managed by a scheduler 200.

A print process in steps S30 to S33 corresponds to a flow chart showing a print execution program for controlling to print an image on a paper sheet (or another recording sheet).

A data acquisition instruction input program in steps S40 to S43 corresponds to a flow chart for recognizing a data acquisition start instruction.

Figure 12:
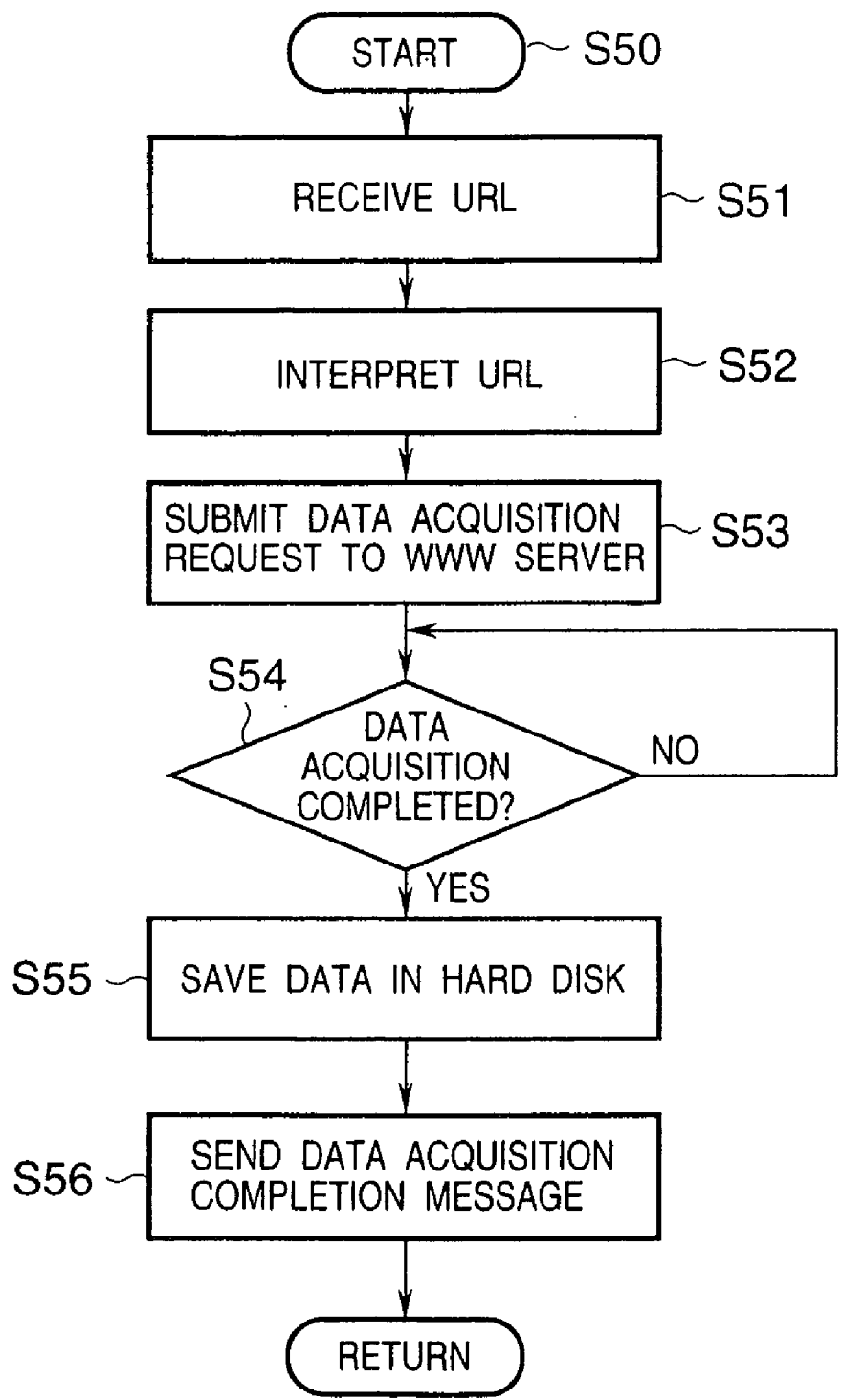
FIG. 12 is a flow chart showing a data acquisition process from a server according to the third embodiment.

Also, details of a data acquisition process from the server in step S50 are shown in the flow chart in FIG. 12. This process corresponds to a flow chart showing a data acquisition program for acquiring data from the WWW server.

The operator inputs an instruction for acquiring data from the WWW server using keys on the console 6 of the image forming apparatus 100. With this operation, a key input event is issued, and a data acquisition instruction routine (S40) is started. The console 6 of the image forming apparatus 100 has an arrangement shown in FIG. 10, and the operator inputs the location of data to be acquired as a character string in the URL format at the keyboard 61. In this case, a character string input at the keyboard 61 is sequentially displayed on the display 60. Upon completion of input of a desired character string, the operator presses the input key 62. In this manner, a URL notification event is issued, and a data acquisition process from the server shown in FIG. 12 is activated.

The URL designates the protocol for acquiring data, the host name of the WWW server that holds data, the location the data is held, and the file name of data. For example, a URL "http://www.aaa.co.jp/pub/document.html" is used to acquire data with file name "document.html" held in a "pub" directory of the WWW server with host name "www.aaa-.co.jp" by the http protocol. In this case, since the host name of the WWW server 7*a* is "www.aaa.co.jp", if this URL is input, data held in the WWW server 7*a* is to be acquired.

In this data acquisition instruction process program, it is checked in step S41 if the operator inputs a URL at the console 6 of the image forming apparatus 100, i.e., submits a data acquisition instruction. If YES in step S41, the flow advances to step S42 to start a data acquisition program. In step S42, the URL input by the operator using the console 6 is fetched. In step S43, the input URL is held to issue a URL input event. In this manner, a data acquisition process from the server in step S50 and the subsequent steps is started.

With the aforementioned process, when the operator designates the location of data to be acquired as a URL using the console 6, that URL is passed to a data acquisition program for acquiring designated data from the server designated by the URL, and that program is activated.

The aforementioned data acquisition instruction program (S40 to S43) runs independently of the data acquisition program (FIG. 12) and the print execution program (S30 to S33), and the operator can input the next data acquisition instruction using the console 6 even during acquisition or printing of data input from the server.

Even when the data acquisition program (FIG. 12) activated by the data acquisition instruction program (S40 to S43) is running, if the operator inputs the next data acquisition instruction, a data acquisition program is started in units of input data acquisition instructions. That is, a plurality of data acquisition programs shown in FIG. 12 can parallelly run to acquire data from the individual servers.

The operation of the data acquisition program will be explained below. The data acquisition program runs, as shown in the flow chart in FIG. 12, as an http client application in the http protocol.

This process is started when a URL is notified upon pressing the input key 62. In step S51, the notified URL is received. The flow advances to step S52 to interpret the URL received in step S51. In this case, the character string of the URL is interpreted to acquire the host name of the WWW server, the directory on the WWW server where data is stored, and the file name of the data, which are designated by the URL.

The flow advances to step S53, and a request for acquiring data, which is located in the directory acquired from the URL in step S52 and has the file name specified by the URL, is submitted to the WWW server having the host name acquired in step S52.

This request is implemented by a control program for controlling the network interface 3, and is sent to the designated WWW server via the network 32. A procedure for acquiring data from this server is done based on that of the http protocol. For example, when a URL "http://www.aaa.co.jp/pub/document.html" is designated, a request "GET/pub/document.html" is sent to the WWW server 7*a* having the host name "www.aaa.co.jp".

This data transfer request is sent to the network interface 3 by the control program that controls the network interface 3, and is then sent from the network interface 3 to the WWW server 7*a* via the network 32. Upon receiving this request, the WWW server 7*a* transfers the contents of the designated file as data on the basis of the contents of the received request via the network 32. The destination is the client that has submitted the request, and in this case, the data is transferred to the image forming apparatus 100 via the network 32 (step S53).

The data transmitted from the WWW server 7*a* is received by the network interface 3 via the network 32, and is transferred to the data acquisition program via a program that controls the network interface 3. The data acquisition program waits for data transferred from the WWW server 7*a*, to which the data acquisition request has been sent, in step S52, and executes step S55 when data reception comes to an end upon completion of data transmission. In step S55, upon completion of reception of data from the WWW server 7*a*, the acquired data is saved in the hard disk 112. Finally, the flow advances to step S56 to issue a data acquisition completion event, thus starting the print execution program in step S30 and the subsequent steps.

While waiting for completion of data acquisition in step S54, when, for example, HTML document data of the server 7*a* includes location information indicating locations where sub data (e.g., another document data, image, audio, and the like) as building components of that document data are held, the program also waits for completion of acquisition of all sub data (e.g., another document data, image, audio, and the like) indicated by the location information included in document data from the server 7*a* on the basis of the location information.

With the aforementioned process, processes in which a data transfer request is sent to the WWW server, data transmitted from that WWW server is received, the received data is saved in the hard disk, and a data acquisition completion message is sent to the print execution program are complete.

The http protocol will be briefly described below.

The http protocol is a service which is specified by a protocol called TCP/IP, and is implemented on a data communication scheme via a network, and is most frequently used in data communications on the Internet.

As a method using such service between a client and server respectively having network interfaces, the client sends a data transmission request to the server, and upon receiving the data transmission request, the server determines data to be transmitted on the basis of information included in that transmission request and transmits data to the client, that transmitted the request, in accordance with the determination result.

The data transmission request from the client is submitted from an http client application on the client to a program called a TCP/IP socket that manages data exchange of the TCP/IP protocol, the TCP/IP socket generates a data transmission request in the TCP/IP protocol format, and the generated data transmission request is sent to a control program that controls the network interface. Upon receiving this request, the control program transmits the data transmission request to the server via the network by controlling the network interface.

On the server side, the data transmission request received by the network interface is received by the control program that controls the network interface, and is received by an http server application that is running on the server via the TCP/IP socket.

The http server application interprets the received data transmission request, and transmits the requested data to the client, that submitted the data transmission request, via the TCP/IP socket, network interface control program, and network interface.

The data from the server is received by the client via the network 32, and is transferred to the http client application via the network interface, network interface control program, and TCP/IP socket.

As described above, upon receiving an instruction from the data acquisition instruction program, the data acquisition program from the server sends a data transmission request to the WWW server, which sends requested data to the image forming apparatus 100 in response to the request. In the image forming apparatus 100, the received data is saved in the hard disk 112 by the data acquisition program. The data acquisition program informs the print execution program of completion of data reception. In this manner, the print execution program is activated to execute a print process.

The print execution program in steps S30 to S33 in FIG. 11 will be explained below. The print execution program is started when the data acquisition program issues a data acquisition completion message event. The program generates image data used upon forming an image by the printer 5 on the basis of data saved in the hard disk 112, transfers the generated image data to the printer 5, and controls the printer 5 to form an image on a paper sheet.

When the print execution program is started, the program checks in step S31 if it receives a data acquisition completion message from the data acquisition program. If YES in step S31, the flow advances to step S32, and the program starts formation of image data. In formation of image data, the data saved in the hard disk 112 by the data acquisition program is read out, and print data to be printed by the printer 5 is generated. In this case, the data read out from the hard disk 112 is interpreted by the printer execution program, and components such as characters, images, lines, figures, and the like included in that data are rasterized on the image memory 2 as print data that can be actually printed.

After the print data is generated on the image memory 2, the flow advances to step S33 to start printing. In this case, the print data held in the image memory 2 is transferred to the printer 5 via the CPU bus 30. The printer 5 feeds a paper sheet, forms an image on the paper sheet on the basis of the transferred print data, and discharges the paper sheet that has undergone image formation.

In this manner, upon receiving the data acquisition completion message from the data acquisition program from the server, data is read out from the hard disk 112, print data to be actually printed is generated on the basis of the readout data, and the printer 5 prints an image on a paper sheet on the basis of the print data.

As described above, by parallelly running the data acquisition instruction program, data acquisition program, and print execution program, a data transmission request can be sent to the WWW server, and data transmitted from that WWW server can be received to execute the print process.

A case will be explained below wherein data are parallelly acquired from a plurality of servers.

The data acquisition instruction program (S40) runs independently of the data acquisition program (S50) and the print execution program (S30), and the operator can input the next data acquisition instruction even when the processes of the data acquisition program and print execution program are underway. In the arrangement shown in FIG. 11 above, a print process task is a single program corresponding to the number of printers 5, but a plurality of programs for executing a data acquisition instruction tasks from the server are prepared. Hence, even when the operator inputs a first data acquisition request of data held on the WWW server 7a, and a first data acquisition program is executing an acquisition process of data from the server 7a, the operator can input an acquisition instruction of data held on another WWW server 7b as a second data acquisition instruction. That is, assuming that the operator inputs an acquisition instruction of data held on the WWW server 7a as the first data acquisition instruction, the first data acquisition program is started and sends a data acquisition request to the WWW server 7a. While the first data acquisition program is executing a data acquisition process from the WWW server 7a, when the operator inputs an acquisition instruction of data held on the WWW server 7b as a second data acquisition instruction, a second data acquisition program is started and sends a data acquisition request to the WWW server 7b.

Assuming that the data on the WWW server 7a designated by the first data acquisition instruction has a very large data size, and the data on the WWW server 7b designated by the second data acquisition instruction has a very small data size, acquisition of the data on the WWW server 7b that has started later comes to an end before that of the data on the WWW server 7a that has started first.

In such case, the second data acquisition program started in response to the second data acquisition request issues a data acquisition completion message first, and the print execution program is started in response to that message. The print execution program generates print data on the basis of the data received from the WWW server 7b designated by the second data acquisition request, and the printer 5 prints that print data. After that, the first data acquisition program started in response to the first data acquisition instruction completes data acquisition, and the print execution program is then started. The print execution program generates print data on the basis of the data received from the WWW server 7a designated by the first data acquisition request, and the printer 5 prints that print data.

As described above, according to the third embodiment, a plurality of servers on the network 32 can be parallelly accessed, and print data can be generated and printed in turn from data that has been acquired from the server earlier. In this manner, the print process can be done in turn from data that has been acquired from the server earlier, irrespective of the order in which data acquisition instructions were input.

In the third embodiment, since image data is generated on the image memory 2 in correspondence with one acquired data, the image memory 2 need only have a storage capacity that can store only image data generated based on one acquired data, and need not use many expensive image memories.

Since the hard disk 112 is prepared, the data received from the server may be saved in the hard disk and used for purposes other than that of the hard disk in the third embodiment.

Fourth Embodiment

Figure 13:
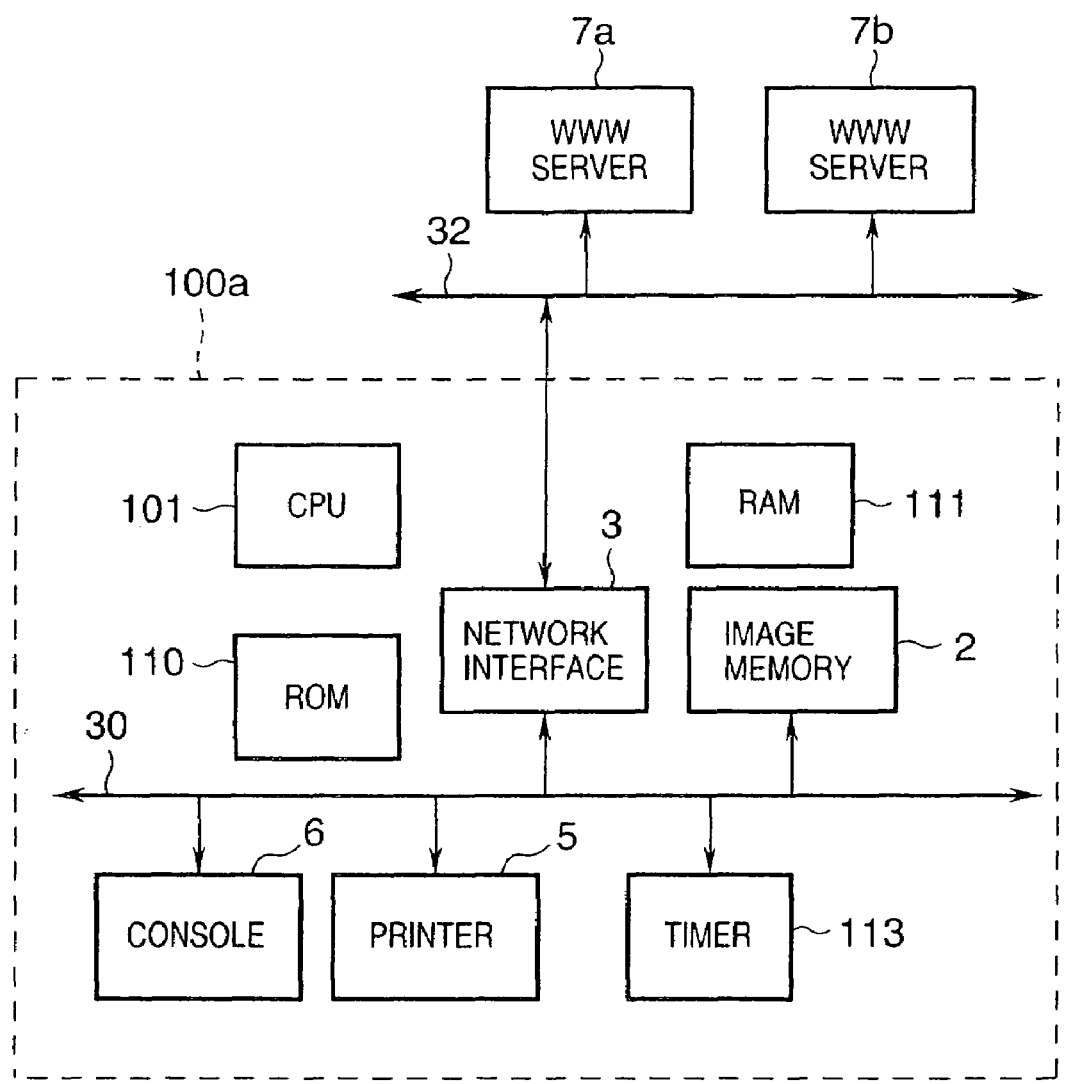
FIG. 13 is block diagram showing the arrangement of a system including an image forming apparatus according to the fourth embodiment of the present invention.

FIG. 13 is a block diagram showing the network arrangement including an image forming apparatus 10a according to the fourth embodiment of the present invention, and WWW servers. The same reference numerals in FIG. 13 denote the same parts as those in FIG. 9 above, and a detailed description thereof will be omitted. As can be seen from a comparison with FIG. 9, the hard disk 112 is omitted from FIG. 13. In this embodiment, assume that the server 7a is a WWW server with host name "www.aaa.co.jp", and the server 7b is a WWW server with host name "www.bbb.com".

Figure 14:
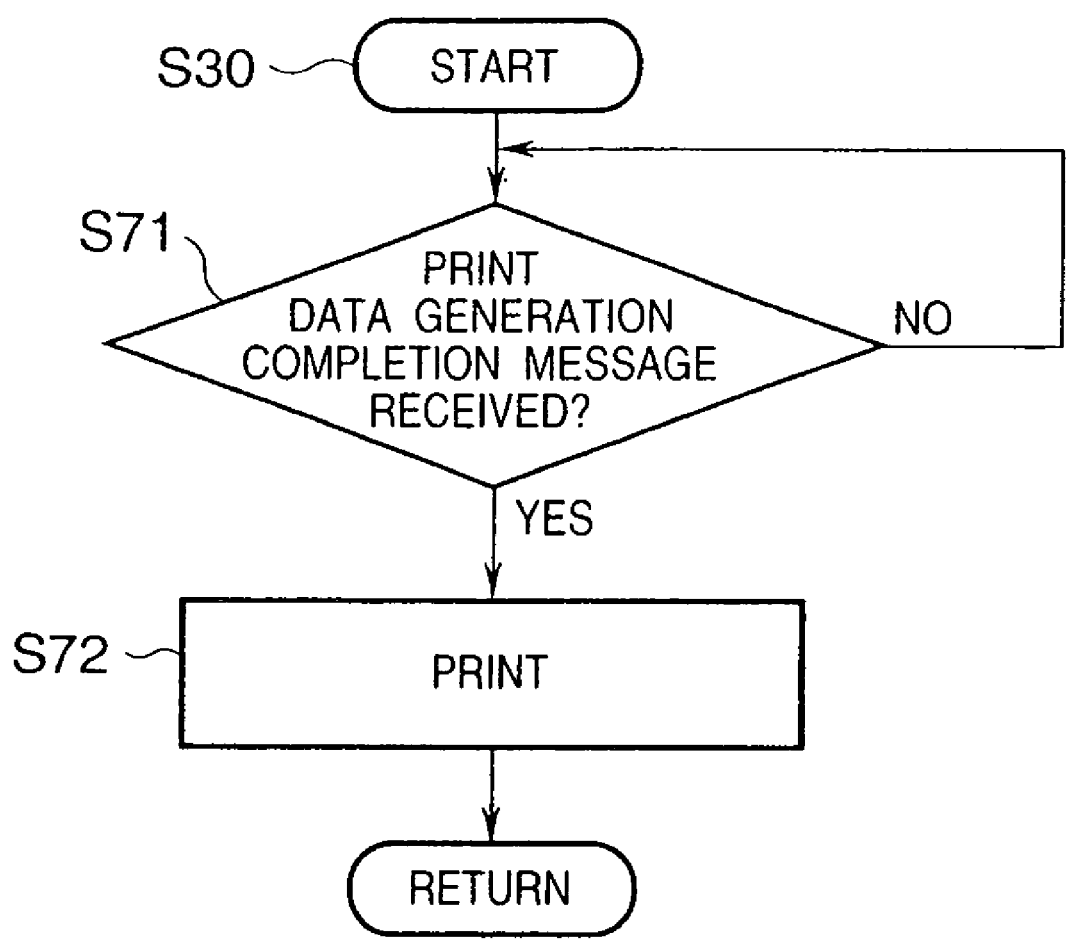
FIG. 14 is a flow chart showing a print execution process according to the fourth embodiment.
Figure 15:
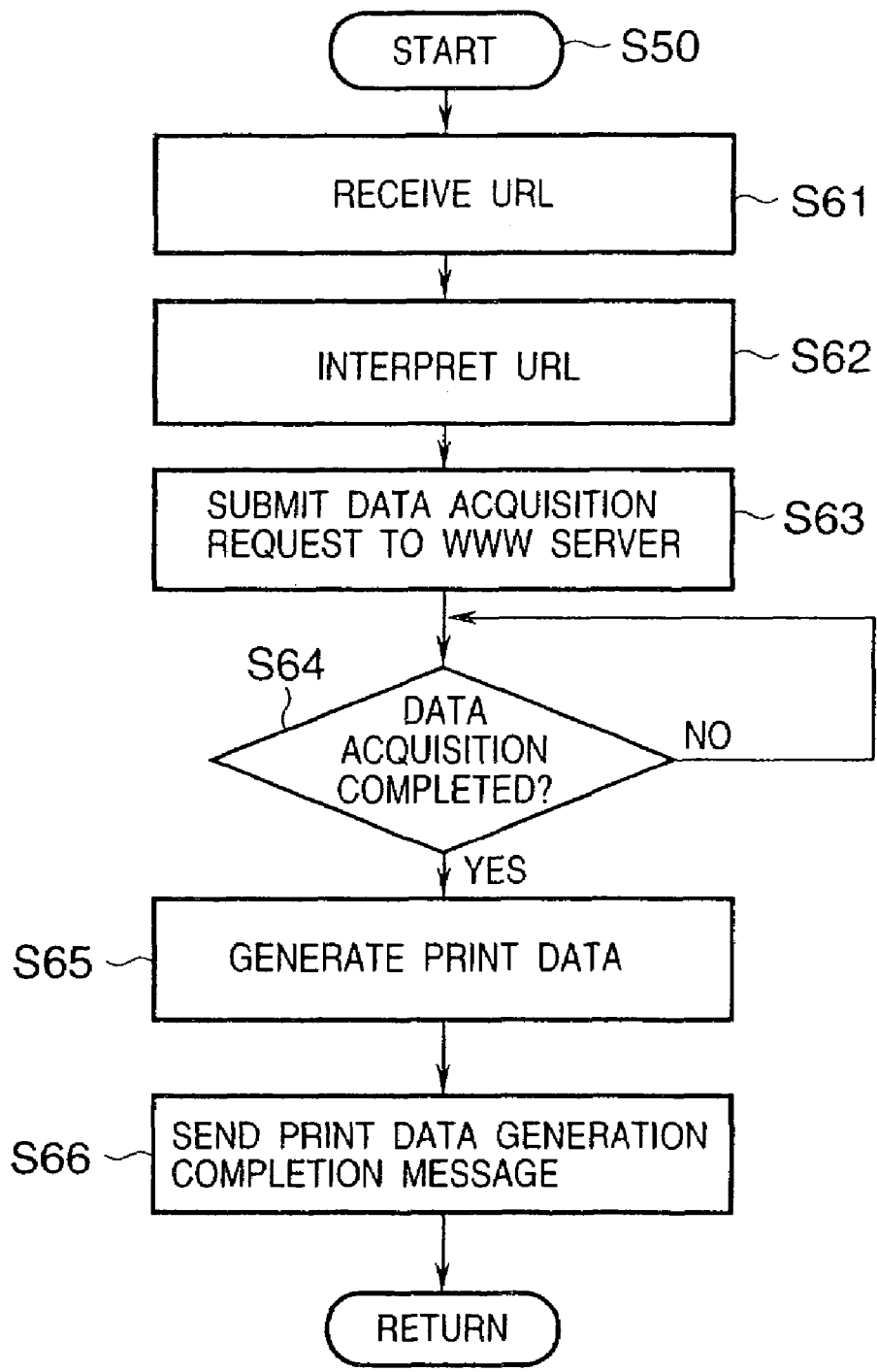
FIG. 15 is a flow chart showing a data acquisition process from a server according to the fourth embodiment.

Of programs running on the image forming apparatus 100a according to the fourth embodiment, FIG. 14 shows the flow chart of a print execution program for image print control on a paper sheet, and FIG. 15 shows the flow chart of a data acquisition program for acquiring data from the WWW server. Note that the programs run on the image forming apparatus 100a as multi-tasks as in FIG. 11. Hence, since the data acquisition instruction program that recognizes the data acquisition start instruction is also available as in the third embodiment described above, and is the same as that in the third embodiment, a detailed description thereof will be omitted. Note that a plurality of programs can parallely run in this image forming apparatus 100a.

Since an instruction input at the console 6 of the image forming apparatus 100a by the operator to acquire data from the WWW server is the same as that in the third embodiment, a description thereof will be omitted.

The operation of the data acquisition program according to the fourth embodiment will be described below with reference to the flow chart in FIG. 15. This data acquisition program runs as an http client application in the http protocol, as shown in the flow chart in FIG. 15.

Referring to FIG. 15, the processes in steps S61 to S64 are the same as those in steps S51 to S54 in FIG. 12. That is, when the data acquisition program is started, the URL of data of which the data acquisition program is informed is received in step S61, and the received URL is interpreted in step S62. In this step, the character string of the URL is interpreted to acquire the host name of the WWW server that holds the data, the directory on the WWW server where the data is stored, and the file name of the data.

In step S63, a request for acquiring data, which is located in the acquired directory and has the acquired file name, is submitted to the WWW server having the acquired host name. This request is executed by a control program for controlling the network interface 3, and is sent to the designated WWW server. A procedure for acquiring data from this server is done based on that of the http protocol. For example, when a URL "http://www.aaa.co.jp/pub/document.html" is designated, a request "GET/pub/document.html" is sent to the WWW server 7a having the host name "www.aaa.co.jp".

This data transfer request is sent from the network interface 3 to the WWW server 7a via the network 32. Upon receiving this request, the WWW server 7a transfers the contents of the designated file as data on the basis of the contents of the received request. The destination is the client that submitted the request, and in this case, the data is transferred to the image forming apparatus 100 via the network 32.

The data transmitted from the WWW server 7a is received by the network interface 3 via the network 32, and is transferred to the data acquisition program via a program that controls the network interface 3. Upon completion of data transmission from the WWW server 7a, the flow advances to step S65 to start formation of image data (print data). In formation of the image data, in order to control the printer 5 to print based on the data received from the WWW server 7a, the received data is interpreted, and components such as characters, images, lines, figures, and the like included in that data are rasterized on the image memory 2 as print data that can be actually printed. After the print data is generated in this way, the flow advances to step S66 to inform the print execution program of completion of generation of the print data. This information includes address information of the area of the image memory 2 where the image data is generated.

With the above process, processes in which a data transfer request is sent to the WWW server, data transmitted from that WWW server is received, the print data is generated on the image memory 2 on the basis of the received data, and a message indicating completion of generation of the print data is sent to the print execution program are executed.

The print execution program according to the fourth embodiment will be described below with reference to the flow chart in FIG. 14.

FIG. 14 is a flow chart showing the print execution program.

When the print execution program is started, it is checked in step S71 if the print data generation completion message issued in step S66 in the data acquisition program (FIG. 15) is received. If YES in step S71, the flow advances to step S72 to read out that print data from the image memory 2 and print it out. Since the print data generation completion message issued in step S66 in the data acquisition program includes address information indicating the area of the image memory 2 where the print data is held, print data stored in the designated area of the image memory 2 is transferred to the printer 5 via the CPU bus 30 on the basis of that address information, thus executing a print process.

In this manner, upon receiving the print data generation completion message from the data acquisition program, the designated print data is read out from the image memory 2, and the printer 5 prints an image on a paper sheet on the basis of the readout print data.

As described above, by running the data acquisition instruction program, data acquisition program, and print execution program, a data transmission request can be sent to the WWW server, and a print process can be executed on the basis of data sent from the WWW server.

A case will be explained below wherein data are parallelly acquired from a plurality of servers. This operation is substantially the same as that in the third embodiment described above.

The data acquisition instruction program runs independently of the data acquisition program and the print execution program, and the operator can input the next data acquisition instruction even when the processes of the data acquisition program and print execution program are underway. Hence, even when the operator inputs a first data acquisition request of data held on the WWW server 7a, and a first data acquisition program is executing an acquisition process of data from the server 7a, the operator can input an acquisition instruction of data held on another WWW server 7b as a second data acquisition instruction.

When the operator inputs an acquisition instruction of data held on the WWW server 7a as the first data acquisition instruction, the first data acquisition program is started and sends a data acquisition request to the WWW server 7a. While the first data acquisition program is executing a data acquisition process from the WWW server 7a, when the operator inputs an acquisition instruction of data held on the WWW server 7b as a second data acquisition instruction, a second data acquisition program is started and sends a data acquisition request to the WWW server 7b.

Assuming that the data on the WWW server 7a designated by the first data acquisition instruction has a very large data size, and the data on the WWW server 7b designated by the second data acquisition instruction has a very small data size, acquisition of the data on the WWW server 7b that has started later comes to an end before that of the data on the WWW server 7a that has started first.

In such case, the second data acquisition program started in response to the second data acquisition request sends a print data generation completion message to the print execution program first. In response to this message, the print execution program controls the printer 5 to print on the basis of print data which is formed based on the data received from the WWW server 7b designated by the second data acquisition instruction. After that, when the first data acquisition program started in response to the first data acquisition instruction sends a print data generation completion message to the print execution program, the print execution program controls the printer 5 to print on the basis of print data which is formed based on the data received from the WWW server 7a designated by the first data acquisition instruction.

As described above, according to the fourth embodiment, since data from the server are printed in turn from that for which generation of print data is complete, when generation of print data based on data from a given server, for which data acquisition and generation of print data have been made parallel to those for another data, is complete first during generation of print data that produces large-size image data, a print process for the print data which is complete first can be started. That is, when a plurality of data are parallelly acquired, the time required until completion of their print processes is highly likely to shorten compared to the third embodiment.

Also, since the need for a hard disk can be obviated compared to the third embodiment, the apparatus arrangement can be simple, system failures are unlikely to occur, and power savings can be attained. In addition, since the need for a space of the hard disk can be obviated, a size reduction of the image forming apparatus can be achieved.

Figure 16:
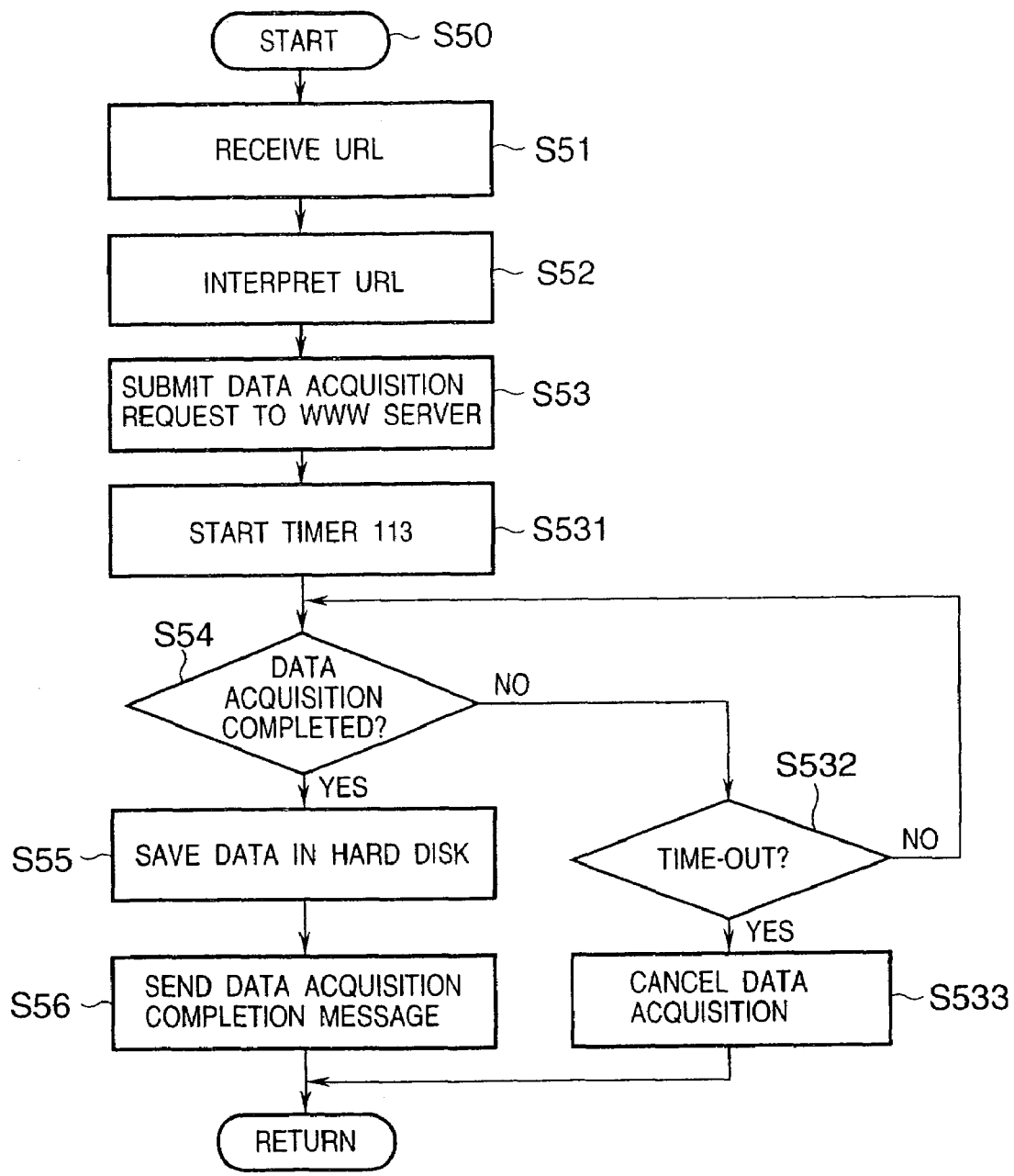
FIG. 16 is a flow chart showing a data acquisition process from a server according to still another embodiment of the present invention.

FIG. 16 is a flow chart showing control depending on time required until completion of data acquisition using the aforementioned timer 113. The same step numbers in FIG. 16 denote the same processes as those in the flow chart in FIG. 12, and a detailed description thereof will be omitted.

After a data acquisition request is submitted to the server in step S53, time measurement by the timer 113 is started in step S531, and it is checked in step S54 if data acquisition is complete. If NO in step S54, the flow advances to step S532 to check if the timer 113 has measured a predetermined time (has reached time-out). If NO in step S532, the flow returns to step S54 to proceed with the data acquisition process. If the timer 113 has measured the predetermined time, i.e., has reached time-out, the flow advances to step S533 to cancel data acquisition from the server, thus ending this process.

Note that the time-out determination process using the timer 113 may be similarly executed in steps S63 and S64 in FIG. 15.

With this control, when data acquisition from a given server requires a very long time due to heavy load on the server or the like, acquisition of that data is temporarily canceled, and the data can be acquired again by selecting a time band in which the load on the server is relatively light.

In the above embodiments, data transfer based on the TCP/IP protocol has been exemplified. However, the network protocol is not limited to TCP/IP, and the present invention can be applied to various other network protocols such as the IPX/SPX protocol developed by Nobell Corp., AppleTalk developed by Apple Corp., and the like.

In the above embodiments, data transfer based on the http protocol has been exemplified. However, the protocol on TCP/IP is not limited to http, and other protocols such as ftp or the like may be used.

In the above description, the embodiments have been independently explained. However, the present invention is not limited to such specific embodiments, and those embodiments may be appropriately combined.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore, to apprise the public of the scope of the present invention, the following claims are made.

What is claimed is:

1. An image forming apparatus comprising:
   input means for inputting a data acquisition request for a server on a network;
   acquisition means for, in a case where a plurality of data acquisition requests for individual servers are inputted by said input means, implementing respective acquisition processes for accessing the individual servers on the network in parallel, and for acquiring respective data from the individual servers;
   image data generation means for generating image formation data on the basis of the respective data acquired in the acquisition processes implemented by said acquisition means;
   image forming means for forming an image on the basis of the image formation data generated by said image data generation means; and
   control means for controlling said image data generation means to generate the image formation data in an order in which said acquisition means has acquired the respective acquired data from the individual servers, and for controlling said image forming means to form an image in an order of the generated image formation data, wherein in a case where a second data acquisition request from said input means is inputted while said acquisition means implements a first acquisition process based on a first data acquisition request from said input means, said acquisition means implements a second acquisition process based on the second data acquisition request in parallel with the first acquisition process, and an order of data acquisition requests from said input means is not always related to the order of respective data acquired in the respective acquisition processes.

2. The apparatus according to claim 1, wherein, when data on a server includes location information which indicates locations where sub-data as building components of the data are held, all sub-data designated by the location information included in the data from the server are acquired by said data acquisition means, and generation of the image formation data by said image data generation means and image formation by said image forming means are started from data for which all data including the sub-data have been acquired.

3. The apparatus according to claim 1, further comprising:
timer means for measuring time required until completion of acquisition of data from the server;
setting means for setting a wait time; and
cancel means for canceling data acquisition from the server when a value measured by said timer means exceeds a predetermined time.

4. An image forming apparatus comprising:
input means for inputting a data acquisition request for a server on a network;
data acquisition means for, in a case where a plurality of data acquisition requests for individual servers are inputted by said input means, implementing respective acquisition processes for accessing the individual servers on the network in parallel, and for acquiring respective data from the individual servers;
image data generation means for generating image formation data corresponding to each server on the basis of the data acquired in the acquisition processes by said data acquisition means, wherein said image data generation means generates the image formation data in an order in which said data acquisition means has acquired the respective acquired data from the individual servers;
image forming means for forming an image on the basis of the image formation data generated by said image data generation means; and
control means for controlling said image forming means to form an image in an order of generation of the generated image formation data,
wherein in a case where a second data acquisition request from said input means is inputted while said acquisition means implements a first acquisition process based on a first data acquisition request from said input means, said acquisition means implements a second acquisition process based on the second data acquisition request in parallel with the first acquisition process, and an order of data acquisition requests from said input means is not always related to the order of respective data acquired in the respective acquisition processes.

5. The apparatus according to claim 4, further comprising:
timer means for measuring time required until completion of acquisition of data from the server;
setting means for setting a wait time; and
cancel means for canceling data acquisition from the server when a value measured by said timer means exceeds a predetermined time.

6. An image forming method comprising:
an input step of inputting a data acquisition request for a server on a network;
an acquisition step of, in a case where a plurality of data acquisition requests for individual servers are inputted in said input step, implementing respective acquisition processes for accessing the individual servers on the network in parallel, and acquiring respective data from the individual servers;
an image data generation step of generating image formation data on the basis of the respective data acquired in the acquisition processes implemented in said acquisition step;
an image forming step of forming an image on the basis of the image formation data generated in said image data generation step; and
a control step of controlling to generate the image formation data in an order in which the respective acquired data have been acquired from the individual servers in said acquisition step, and to form an image in an order of generation of the generated image formation data,
wherein in a case where a second data acquisition request is inputted in said input step while said acquisition step implements a first acquisition process based on a first data acquisition request, said acquisition step implements a second acquisition process based on the second data acquisition request in parallel with the first acquisition process, and an order of data acquisition requests inputted in said input step is not always related to the order of respective data acquired in the respective acquisition processes.

7. The method according to claim 6, wherein, when data on the server includes location information which indicates locations where sub-data as building components of the data are held, all sub-data designated by the location information included in the data from the server are acquired in said data acquisition step, and generation of the image formation data and image formation are started from data for which all data including the sub-data have been acquired.

8. The method according to claim 6, further comprising:
a time measurement step of measuring time required until completion of acquisition of data from the server;
a setting step of setting a wait time; and
a cancel step of canceling data acquisition from the server when a value measured in said time measurement step exceeds a predetermined time.

9. An image forming method comprising:
an input step of inputting a data acquisition request for a server on a network;
an acquisition step of, in a case where a plurality of data acquisition requests for individual servers are inputted in said input step, implementing respective acquisition processes for accessing the individual servers on the network in parallel, and of acquiring respective data from the individual servers;
an image data generation step of generating image formation data corresponding to each server on the basis of the data acquired in the acquisition processes in said acquisition step wherein the image formation data is generated in an order in which the respective acquired data are acquired from the individual servers in said acquisition step;

an image forming step of forming an image on the basis of the image formation data generated in said image data generation step; and a control step of controlling to generate the image formation data in an order of generation of generated image formation data, wherein in a case where a second data acquisition request is inputted in said input step while said acquisition step implements a first acquisition process based on a first data acquisition request, said acquisition step implements a second acquisition process based on the second data acquisition request in parallel with the first acquisition process, and an order of data acquisition requests inputted in said input step is not always related to the order of respective data acquired in the respective acquisition processes.

10. The method according to claim 9, further comprising:

a time measurement step of measuring time required until completion of acquisition of data from the server;

a setting step of setting a wait time; and a cancel step of canceling data acquisition from the server when a value measured in said time measurement step exceeds a predetermined time.

11. A computer readable storage medium which stores a program for implementing an image forming method comprising:

an input step module of inputting a data acquisition request for a server on a network;

an acquisition step module of, in a case where a plurality of data acquisition requests for individual servers are inputted in said input step module, implementing respective acquisition processes for accessing the individual servers on the network in parallel, and of acquiring respective data from the individual servers;

an image data generation step module of generating image formation data on the basis of the respective data acquired in the acquisition processes implemented in said acquisition step module;

an image forming step module of forming an image on the basis of the image formation data generated in said image data generation step module; and a control step module of controlling to generate the image formation data in an order in which the respective acquired data have been acquired from the individual servers in said acquisition step module, and to form an image in an order of generation of the generated image formation data, wherein in a case where a second data acquisition request is inputted in said input step module while said acquisition step module implements a first acquisition process based on a first data acquisition request, said acquisition step module implements a second acquisition process based on the second data acquisition request in parallel with the first acquisition process, and an order of data acquisition requests inputted in said input step module is not always related to the order of respective data acquired in the respective acquisition processes.

12. A computer readable storage medium which stores a program for implementing an image forming method, comprising:

an image step module of inputting a data acquisition request for a server on a network;

an acquisition step module of, in a case where a plurality of data acquisition requests for individual servers are inputted by said input step module, implementing respective acquisition processes for accessing the individual servers on the network, in parallel, and of acquiring respective data from the individual servers;

an image data generation step module of generating image formation data corresponding to each server on the basis of the data acquired in the acquisition processes in said data acquisition step module, wherein the image formation data is generated in an order in which the respective acquired data are acquired from the individual servers in said acquisition step module;

an image forming step module of forming an image on the basis of the image formation data generated in said image data generation step module; and a control step module of controlling to form an image in an order of generation of the generated image formation data, wherein in a case where a second data acquisition request is inputted in said input step module while said acquisition step implements a first acquisition process based on a first data acquisition request, said acquisition step module implements a second acquisition process based on the second data acquisition request in parallel with the first acquisition process, and an order of data acquisition requests inputted in said input step module is not always related to the order of respective data acquired in the respective acquisition processes.

* * * * *

UNITED STATES PATENT AND TRADEMARK OFFICE
CERTIFICATE OF CORRECTION

PATENT NO. : 7,274,483 B2  Page 1 of 1
APPLICATION NO. : 11/180557
DATED : September 25, 2007
INVENTOR(S) : Kenji Aiyama et al.

It is certified that error appears in the above-identified patent and that said Letters Patent is hereby corrected as shown below:

COLUMN 4:
Line 3, "embodiments" should read --embodiment--.

COLUMN 13:
Line 42, "fist" should read --first--.

COLUMN 18:
Line 61, "apparatus 10a" should read --apparatus 100a--.

COLUMN 22:
Line 50, "network:" should read --network;--.

COLUMN 26:
Line 26, "said data" should read --said--.

Signed and Sealed this

Tenth Day of June, 2008

JON W. DUDAS
*Director of the United States Patent and Trademark Office*